US011778336B2

(12) United States Patent
Fukuda

(10) Patent No.: US 11,778,336 B2
(45) Date of Patent: Oct. 3, 2023

(54) IMAGE CAPTURING APPARATUS AND CONTROL METHOD THEREOF

(71) Applicant: CANON KABUSHIKI KAISHA, Tokyo (JP)

(72) Inventor: Atsushi Fukuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/718,566

(22) Filed: Apr. 12, 2022

(65) Prior Publication Data
US 2022/0239823 A1 Jul. 28, 2022

Related U.S. Application Data

(63) Continuation of application No. 16/849,317, filed on Apr. 15, 2020, now Pat. No. 11,336,836.

(30) Foreign Application Priority Data

Apr. 19, 2019 (JP) ................. 2019-080471

(51) Int. Cl.
H04N 23/741 (2023.01)
H04N 5/953 (2006.01)
H04N 5/38 (2006.01)
H04N 23/62 (2023.01)

(52) U.S. Cl.
CPC ............ *H04N 23/741* (2023.01); *H04N 5/38* (2013.01); *H04N 5/953* (2013.01); *H04N 23/62* (2023.01)

(58) Field of Classification Search
CPC .................................. H04N 23/741

USPC ....................................... 348/222.1
See application file for complete search history.

(56) References Cited

U.S. PATENT DOCUMENTS 10,382,740 B2  8/2019  Fukuda
2018/0124377 A1* 5/2018  Fukuda ............... H04N 13/189

FOREIGN PATENT DOCUMENTS

JP   2018007194 A   1/2018
WO  2014/178286 A1  11/2014
WO  2018/092711 A1  5/2018

OTHER PUBLICATIONS

Notice of Reasons for Refusal issued by the Japan Patent Office dated Mar. 27, 2023 in corresponding JP Patent Application No. 2019-080471, with English translation.

* cited by examiner

Primary Examiner — Joel W Fosselman
(74) Attorney, Agent, or Firm — Carter, DeLuca & Farrell LLP

(57) ABSTRACT

An image capturing apparatus comprises an interface configured to connect to an external apparatus, a transmitting unit configured to transmit image data to an external apparatus connected by the interface, a processing unit configured to encode the image data with a predetermined format, a determination unit configured to determine whether or not image data to be encoded by the processing unit includes decoding information for decoding the image data, and a control unit configured to switch, based on the determination result, between processing for transmitting image data encoded by the processing unit and the decoding information to the external apparatus and processing for transmitting an image file in which image data including the decoding information is encoded to the external apparatus.

15 Claims, 15 Drawing Sheets

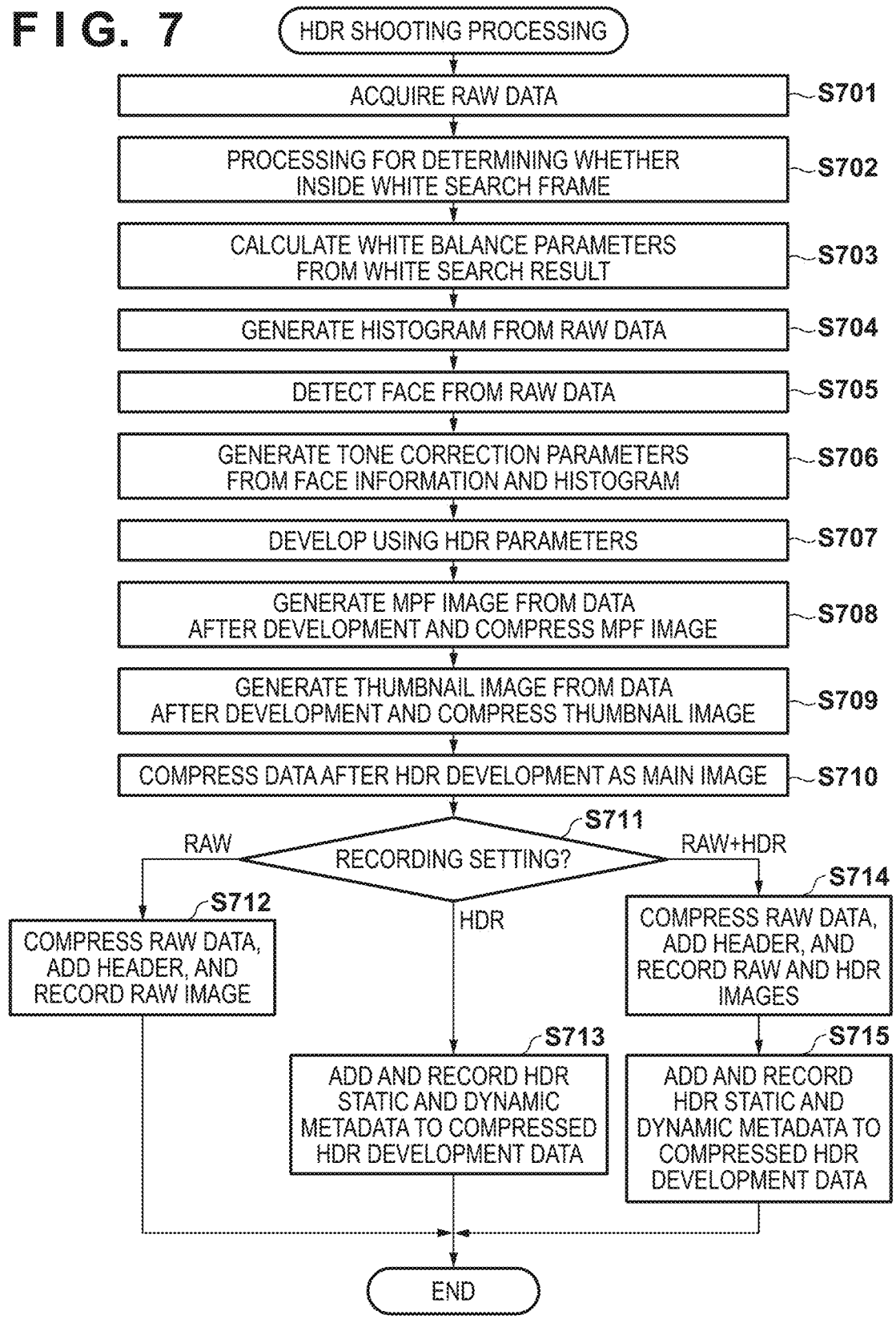

FIG. 9A

| | |
|---|---|
| 809 → | DISPLAY SDR THM IMAGE (JPEG) — 821 |
| | DISPLAY SDR MPF IMAGE (JPEG) — 822 |
| | DISPLAY SDR MAIN IMAGE (JPEG) — 823 |
| | RAW IMAGE — 824 |
| | RAW DEVELOPMENT PARAMETER — 825 |

FIG. 9B

| | |
|---|---|
| 809 → | DISPLAY HDR THM IMAGE (HEVC) — 826 |
| | DISPLAY HDR MPF IMAGE (HEVC) — 827 |
| | DISPLAY HDR MAIN IMAGE (HEVC) — 828 |
| | RAW IMAGE — 824 |
| | RAW DEVELOPMENT PARAMETER — 825 |

FIG. 9C

| | |
|---|---|
| 809 → | DISPLAY SDR THM IMAGE (JPEG) — 821 |
| | DISPLAY HDR THM IMAGE (HEVC) — 826 |
| | DISPLAY SDR MPF IMAGE (JPEG) — 822 |
| | DISPLAY HDR MPF IMAGE (HEVC) — 827 |
| | DISPLAY SDR MAIN IMAGE (JPEG) — 823 |
| | DISPLAY HDR MAIN IMAGE (HEVC) — 828 |
| | RAW IMAGE — 824 |
| | RAW DEVELOPMENT PARAMETER — 825 |

FIG. 9D

| | |
|---|---|
| 809 → | DISPLAY SDR THM IMAGE (JPEG) — 821 |
| | DISPLAY HDR MPF IMAGE (HEVC) — 827 |
| | DISPLAY HDR MAIN IMAGE (HEVC) — 828 |
| | RAW IMAGE — 824 |
| | RAW DEVELOPMENT PARAMETER — 825 |

TONE CORRECTION

TONE CORRECTION

IMAGE CAPTURING APPARATUS AND CONTROL METHOD THEREOF

CROSS REFERENCE TO RELATED APPLICATIONS

This application is a continuation of U.S. patent application Ser. No. 16/849,317, filed on Apr. 15, 2020, which claims the benefit of and priority to Japanese Patent Application No. 2019-080471, filed Apr. 19, 2019, each of which is hereby incorporated by reference herein in their entirety.

BACKGROUND OF THE INVENTION

Field of the Invention

The present embodiment relates to an image capturing apparatus, a control method thereof.

Description of the Related Art

Image capturing apparatuses such as digital cameras can generate an HDR (High Dynamic Range) image that has a wider dynamic range than a known SDR (Standard Dynamic Range) image from a shot RAW image. The RAW image is a raw image before subjecting to development processing. In Japanese Patent Laid-Open No. 2018-7194, a method is described in which, when an HDR video content is recorded, the content is recorded along with identification information indicating whether or not the content is an HDR video.

Here, there is a use case in which an HDR image shot by an image capturing apparatus is transferred to an external apparatus, and the external apparatus displays and saves the HDR image. When an image is saved in the external apparatus, it is envisioned that the saved image data will be used in another way, therefore it is desirable that the image is saved in a file format that has high compatibility. As a result of transmitting an HDR image in the file format, the external apparatus can save the HDR image without performing additional processing. When the external apparatus displays an HDR image, it is desirable that the image is smoothly displayed at a high frame rate.

When an HDR image is transmitted to an external apparatus in a file format, the data size thereof increases. Also, additional processing is needed in order to analyze the file format. Such an increase in processing time hinders the external apparatus from performing smooth display. Also, with HEVC, which is a file format for storing an HDR image, decoding information for decoding compression-encoded image data cannot be embedded in the image data. Therefore, if only image data is transmitted, the external apparatus cannot decode and display the image data.

SUMMARY OF THE INVENTION

The present invention has been made in consideration of the aforementioned problems, and realizes techniques for an external apparatus to smoothly display image data and save the image data in a file format having high compatibility.

In order to solve the aforementioned problems, the present embodiment provides an image capturing apparatus comprising: an interface configured to connect to an external apparatus; a transmitting unit configured to transmit image data to an external apparatus connected by the interface; a processing unit configured to encode the image data with a predetermined format; and a memory and at least one processor and/or at least one circuit to perform operations of the following units: a determination unit configured to determine whether or not image data to be encoded by the processing unit includes decoding information for decoding the image data; and a control unit configured to switch, based on the determination result, between processing for transmitting image data encoded by the processing unit and the decoding information to the external apparatus and processing for transmitting an image file in which image data including the decoding information is encoded to the external apparatus.

In order to solve the aforementioned problems, the present embodiment provides an image capturing apparatus comprising: an interface configured to connect to an external apparatus; a transmitting unit configured to transmit image data to an external apparatus connected by the interface; a processing unit configured to encode the image data with a predetermined format; and a memory and at least one processor and/or at least one circuit to perform operations of the following units: a determination unit configured to determine whether the image data is to be saved or to be displayed in the external apparatus; and a control unit configured to switch, based on the determination result, between processing for transmitting image data and decoding information for decoding the image data to the external apparatus and processing for transmitting an image file in which image data including the decoding information is encoded to the external apparatus.

In order to solve the aforementioned problems, the present embodiment provides a method of controlling an image capturing apparatus including a transmitting unit that transmits image data to an external apparatus connected by an interface and a processing unit that encodes the image data with a predetermined format, the method comprising: determining whether or not image data to be encoded by the processing unit includes decoding information for decoding the image data; and switching, based on the result in the determining, between processing for transmitting image data encoded by the processing unit and the decoding information to the external apparatus and processing for transmitting an image file in which image data including the decoding information is encoded to the external apparatus.

In order to solve the aforementioned problems, the present embodiment provides a method of controlling an image capturing apparatus including a transmitting unit that transmits image data to an external apparatus connected by an interface and a processing unit that encodes the image data with a predetermined format, the method comprising: determining whether the image data is to be saved or to be displayed in the external apparatus; and switching, based on the result in the determining, between processing for transmitting image data and decoding information for decoding the image data to the external apparatus and processing for transmitting an image file in which image data including the decoding information is encoded to the external apparatus.

In order to solve the aforementioned problems, the present embodiment provides a non-transitory computer-readable storage medium storing a program for causing a computer to function as an image capturing apparatus comprising: an interface configured to connect to an external apparatus; a transmitting unit configured to transmit image data to an external apparatus connected by the interface; a processing unit configured to encode the image data with a predetermined format; a determination unit configured to determine whether or not image data to be encoded by the processing unit includes decoding information for decoding the image data; and a control unit configured to switch, based on the determination result, between processing for transmitting image data encoded by the processing unit and the decoding information to the external apparatus and processing for transmitting an image file in which image data including the decoding information is encoded to the external apparatus.

In order to solve the aforementioned problems, the present embodiment provides a non-transitory computer-readable storage medium storing a program for causing a computer to function as an image capturing apparatus comprising: an interface configured to connect to an external apparatus; a transmitting unit configured to transmit image data to an external apparatus connected by the interface; a processing unit configured to encode the image data with a predetermined format; a determination unit configured to determine whether the image data is to be saved or to be displayed in the external apparatus; and a control unit configured to switch, based on the determination result, between processing for transmitting image data and decoding information for decoding the image data to the external apparatus and processing for transmitting an image file in which image data including the decoding information is encoded to the external apparatus.

According to the present invention, the techniques for an external apparatus to smoothly display image data and save the image data in a file format having high compatibility can be realized.

Further features of the present invention will become apparent from the following description of exemplary embodiments (with reference to the attached drawings).

BRIEF DESCRIPTION OF THE DRAWINGS

FIG. 7 is a flowchart illustrating HDR shooting processing of the present embodiment.

FIGS. 9A to 9D are data configuration diagrams of ImageData in the RAW file.

DESCRIPTION OF THE EMBODIMENTS

Figure 1A:
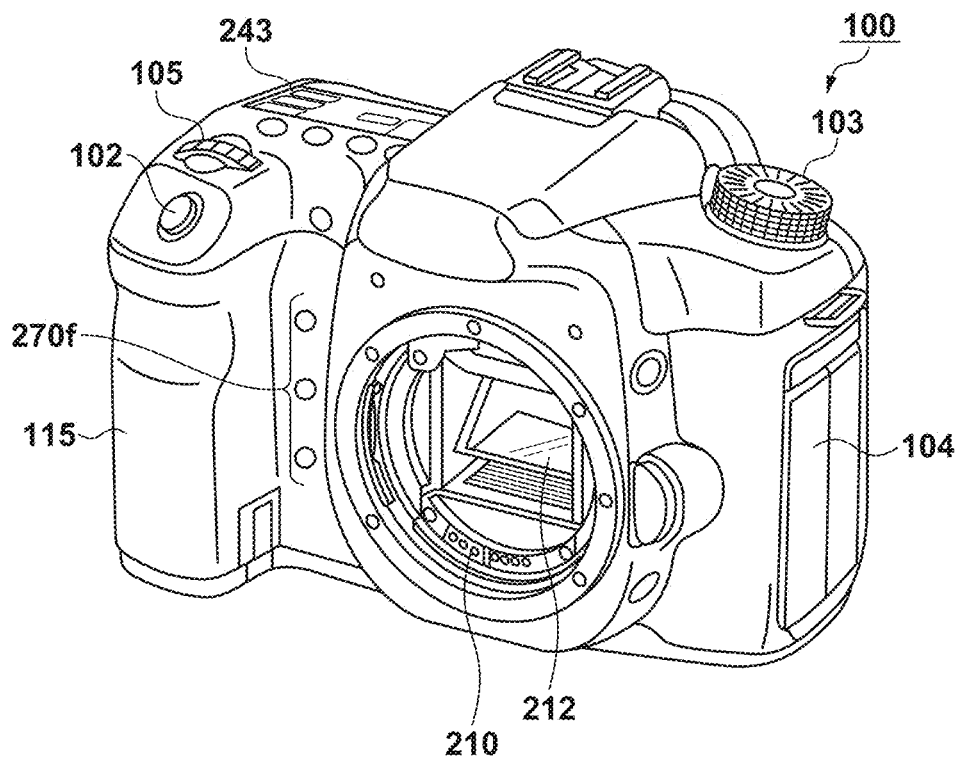
FIG. 1A is a front perspective view of an apparatus of the present embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate.

Furthermore, in the attached drawings, the same reference numerals are given to the same or similar configurations, and redundant description thereof is omitted.

First Embodiment

Embodiments upon application of the present invention to an image capturing apparatus such as a digital single-lens reflex camera capable of shooting a still image and/or moving image will be described in detail hereinafter with reference to the drawings.

Apparatus Configuration

The configuration and functions of a camera according to the present embodiment will be described below with reference to FIGS. 1A, 1B and 2.

Figure 1B:
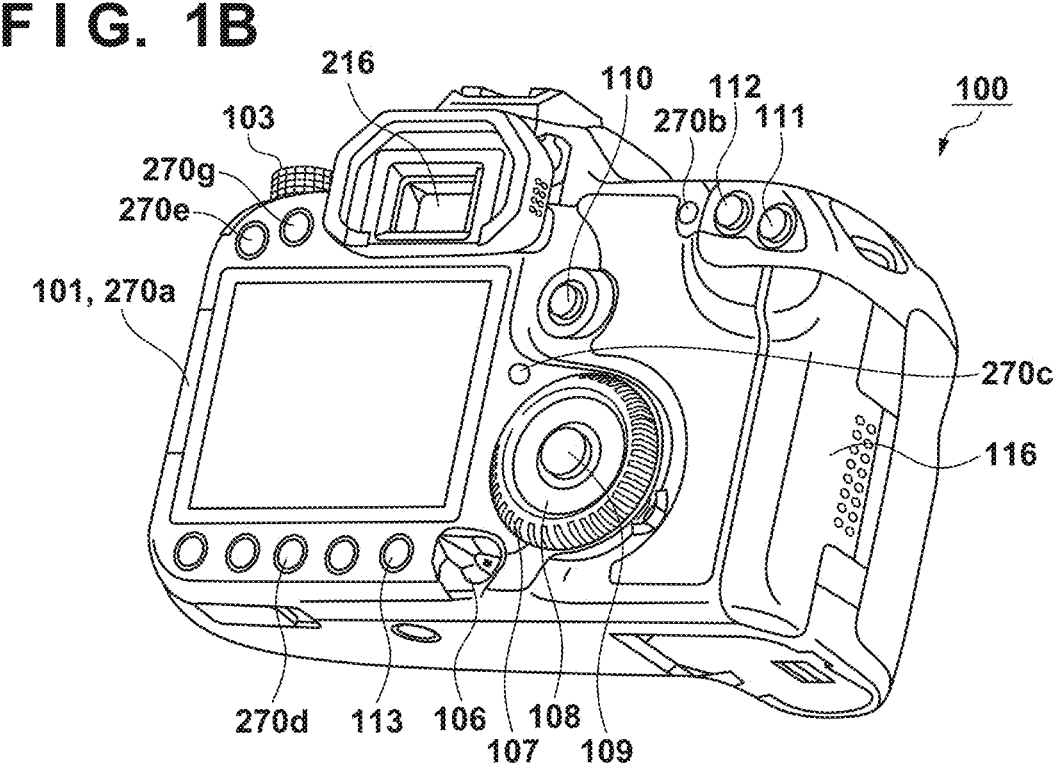
FIG. 1B is a back perspective view of the apparatus of the present embodiment.

FIG. 1A is a front perspective view of the digital camera 100, and FIG. 1B is a back perspective view of the digital camera 100.

In FIGS. 1A and 1B, a backside display unit 101 is a display device for displaying images and various types of information, such as an LCD provided on the back surface of the camera body. Moreover, the backside display unit 101 has a function of reproducing a still image after the still image was shot, a function of displaying a moving image that is being recorded, and a live view display (through-the-lens display) function as well. An out-of-finder display unit 243 is a display device such as an LCD provided on the upper surface of the camera body, and displays various setting values of the camera such as a shutter speed and a diaphragm aperture.

A shutter-release button 102 is an operation unit for giving a shooting instruction. A mode selection switch 103 is a dial type operation unit for switching between various modes. A terminal cover 104 is a cover member for protecting a connector (not illustrated) for connecting an external device and the digital camera 100 via a cable such as a USB cable. A main electronic dial 105 is a rotating operation member included in operation units 270 that will be described later with reference to FIG. 2, and by rotating this main electronic dial 105, setting values such as a shutter speed and a diaphragm aperture can be changed.

A power supply switch 106 is an operation member for the switching on/off of the power supply to the digital camera 100. A sub electronic dial 107 is also a rotating operation member included in the operation units 270 that will be described later with reference to FIG. 2, and can move a selected frame, scroll images, and the like. A cross key 108 is a movement instruction member also included in the operation units 270 that will be described later with reference to FIG. 2, and can perform, by one of four-directional buttons constituted by UP, DOWN, LEFT and RIGHT being pressed down, an operation that corresponds to the pressed portion of the cross key 108.

A SET button 109 is a push button also included in the operation units 270 that will be described later with reference to FIG. 2, and is mainly used for determining selection items, and the like. A live view button 110 is also a push button included in the operation units 270 that will be described later with reference to FIG. 2, is used for the switching on/off of live view (hereinafter, it may be referred to as "LV") display in a still image shooting mode, and is used for giving an instruction to start or stop moving image shooting (recording) in a moving image recording mode. An enlargement button 111 is also a push button included in the operation units 270 that will be described later with reference to FIG. 2, and is an operation member for the switching on/off of enlarged display during a live view and changing the magnification during the enlarged display. In addition, the enlargement button 111 is an operation member for enlarging a reproduced image and increasing the magnification in a reproduction mode. A reduction button 112 is also a push button included in the operation units 270 that will be described later with reference to FIG. 2, and is an operation member for reducing the magnification of a reproduced image that is enlarged, and displays a screen in a reduced state. A reproduction button 113 is also a push button included in the operation units 270 that will be described later with reference to FIG. 2, and is an operation member for switching between a shooting mode and a reproduction mode. When the reproduction button 113 is pressed during the shooting mode, the operation mode transits to the reproduction mode, and the latest image among the images recorded on the recording medium 250 can be displayed on the backside display unit 101 or the external apparatus 300.

A quick return mirror 212 is driven to an upward position (an exposure position) or a downward position (a live view position) by an actuator (not illustrated) in accordance with an instruction from a system control unit 201 that will be described later with reference to FIG. 2. A communication terminal 210 is an electric contact for the digital camera 100 to perform communication with a lens unit 200 (FIG. 2). A look-in eyepiece finder 216 is an optical member for checking, by observing a focusing screen 213 (FIG. 2), the focus and composition of an object image taken in through the lens unit 200. A lid 116 is a member for opening or closing a slot for mounting/removing the recording medium 250 to/from the digital camera 100. A grip 115 has a shape that makes it easy to be grasped by a user's a right hand when he or she holds the digital camera 100.

Further, the digital camera 100 includes an AF-ON button 270*b*, a quick setting button 270*c*, an active frame switching button 270*d*, a menu button 270*e*, a function button 270*f*, and an info button 270*g* as operation members included in the operation units 270 that will be described later with reference to FIG. 2.

Next, the internal configuration of the digital camera 100 and lens unit 200 according to the present embodiment will be described with reference to FIG. 2. In FIG. 2, configurations that are the same as in FIGS. 1A and 1B are denoted by the same reference signs.

Figure 2:
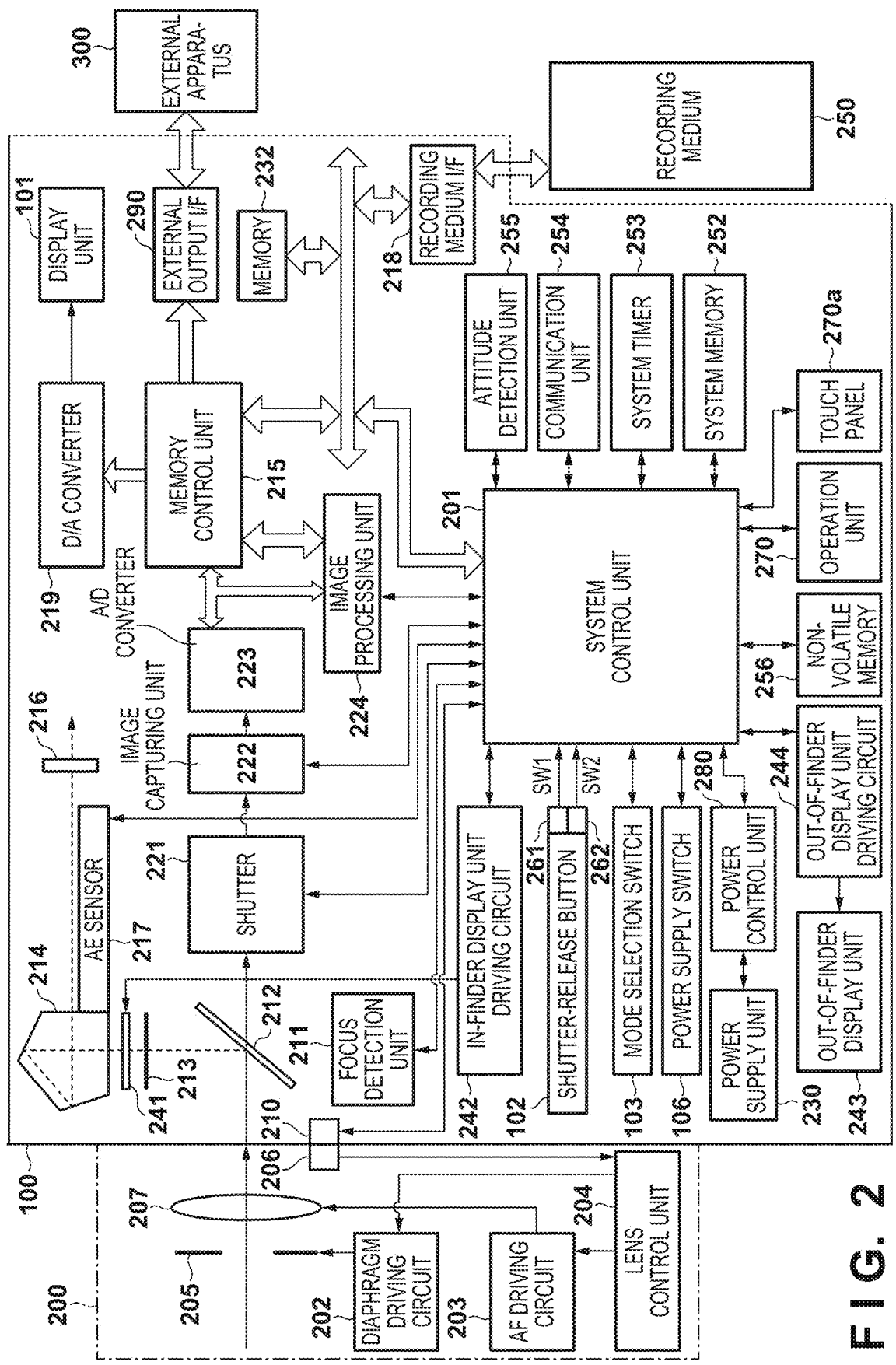
FIG. 2 is a block diagram showing an apparatus configuration of the present embodiment.

In FIG. 2, the lens unit 200 is equipped with a shooting lens 207, and is detachable from the digital camera 100. The shooting lens 207 is usually constituted by a plurality of lenses, but is simplified here and is shown by one lens only. A communication terminal 206 is an electric contact for the lens unit 200 to perform communication with the digital camera 100. The communication terminal 210 is an electric contact for the digital camera 100 to perform communication with the lens unit 200. The lens unit 200 performs communication with the system control unit 201 via the communication terminal 206, and a built-in lens control unit 204 controls a diaphragm driving circuit 202 so as to drive a diaphragm aperture 205, and controls an AF driving circuit 203 so as to displace the position of the shooting lens 207, thereby bringing the object image in focus.

An AE sensor 217 performs photometry to obtain the luminance of the object taken in through the lens unit 200. A focus detection unit 211 outputs a defocus amount to the system control unit 201, and the system control unit 201 communicates with the lens unit 200 in accordance with the defocus amount, and performs a control for automatic focus processing using a phase difference detection method.

The quick return mirror 212 receives an instruction from the system control unit 201 at the time of exposure, live view display, and moving image shooting, and is driven to the upward position or the downward position by the actuator (not illustrated). The quick return mirror 212 switches luminous flux entering the shooting lens 207 to the eyepiece finder 216 or an image capturing unit 222. The quick return mirror 212 is usually biased toward the downward position so as to reflect the luminous flux and guide the luminous flux to the eyepiece finder 216, but for exposure and live view display, jumps upward and recedes from the luminous flux (to the upward position) so as to guide the luminous flux to the image capturing unit 222. In addition, the central portion of the quick return mirror 212 is a half mirror such that a portion of the luminous flux passes through and enters the focus detection unit 211. The photographer can check, via a pentagonal prism 214 and the eyepiece finder 216, the focus and composition of the object image taken in through the lens unit 200 by observing the focusing screen 213.

A focal plane shutter 221 can freely control the exposure time of the image capturing unit 222 in accordance with an instruction from the system control unit 201. The image capturing unit 222 is an image sensor constituted by an imaging element such as a CCD or a CMOS for converting the object image into electrical signals. Filters of R, G, and B color components are periodically arranged on an imaging plane of the image capturing unit 222 two-dimensionally. When adjacent 2×2 filters are focused on, two filters of the G component are diagonally arranged, and filters of the R component and the B component are arranged in the remaining two positions. Also, this 2×2 filters are arrayed on the imaging plane of the image capturing unit 222. This arrangement is generally referred to as a Bayer arrangement. Therefore, signals (analog signals) representing an image that are output from the image capturing unit 222 are pixel signals in the Bayer arrangement. An A/D converter 223 converts an analog signal of one pixel output from the image capturing unit 222 to a 10-bit signal, for example. Note that the image data at this stage includes one component per one pixel, and is 10-bit image data per one component in the Bayer arrangement, as described above, which is undeveloped image data. Therefore, the image data at this stage is referred to as RAW image data. Note that the RAW image data may also be image data in the Bayer arrangement subjected to defective pixel correction. Note that, in the present embodiment, the A/D converter 223 converts an analog signal to 10-bit digital data, but the number of bits need only be 9 or more, and no specific limitation is imposed. The larger the number of bits is, the higher the level of high-gradation expression is.

An image processing unit 224 performs resizing processing, such as predetermined pixel interpolation and reduction, and color conversion processing, with respect to data from the A/D converter 223 or data from a memory control unit 215. Further, the image processing unit 224 performs predetermined calculation processing using the captured image data, and the system control unit 201 performs exposure control and focus control based on the calculation results. Thus, AF (Automatic Focus) processing, AE (Automatic Exposure) processing, and EF (flash pre-emission) processing of TTL (Through the Lens) type are performed. Furthermore, the image processing unit 224 performs predetermined calculation processing using the captured image data, and AWB (Automatic White Balance) processing of TTL type is performed on the basis of the calculation results. Moreover, the image processing unit 224 also performs compression-encoding/decoding processing on image data under the control of the system control unit 201. The compression-encoding processing includes JPEG (Joint Photographic Experts Group) encoding and HEVC encoding. JPEG encoding is a compression-encoding method in which 8-bit image data per one color component is compression-encoded, and HEVC encoding is a compression-encoding method in which 9-bit or more image data per one color component is compression-encoded.

The digital data from the A/D converter 223 is directly written into a memory 232 via both the image processing unit 224 and the memory control unit 215 or via the memory control unit 215. The memory 232 stores the image data obtained from the image capturing unit 222 and the A/D converter 223, and image display data to be displayed on the backside display unit 101 or the external apparatus 300. The memory 232 has a storage capacity that is sufficient for storing a predetermined number of still images as well as moving images and audio for a predetermined time period. The memory 232 also functions as a memory for image display (video memory).

A D/A converter 219 converts the image display data stored in the memory 232 into an analog signal and supplies the backside display unit 101 with the analog signal. The image display data that was written into the memory 232 is displayed by the backside display unit 101 via the D/A converter 219. The backside display unit 101 performs display in accordance with the analog signal from the D/A converter 219. In this manner, the digital signals stored in the memory 232 are converted into analog signals, and the analog signals are successively transmitted to the backside display unit 101 so as to be displayed thereon, making it possible to realize an electronic view finder (EVF) functionality and to perform live view display (through image display).

A frame that indicates a ranging point (AF position) at which AF processing is currently performed, an icon that indicates the setting state of the camera, and the like are displayed on an in-finder display unit 241 via an in-finder display unit driving circuit 242. Accordingly, the user can check the AF position and camera setting state through an optical viewfinder (OVF) that enables an object image picked up by the lens unit 200 to be viewed by looking through the eyepiece viewfinder 216.

Various setting values of the camera such as a shutter speed and a diaphragm aperture are displayed on the out-of-finder display unit 243 via an out-of-finder display unit driving circuit 244.

An external output I/F 290 supplies image display data stored in the memory 232 to the external apparatus 300 in a form of digital signal as is. For example, the external output I/F 290 outputs moving image data in a stream format in accordance with a communication protocol conforming to the HDMI (registered trademark) (High-Definition Multimedia Interface) standard. In this way, the display image data written into the memory 232 is displayed in the external apparatus 300.

A nonvolatile memory 256 is, for example, an EEPROM, which is electrically erasable and recordable. In the nonvolatile memory 256, constants and programs, for example, for operating the system control unit 201 are stored. In this context, "programs" may refer to programs for executing various flowcharts that will be described later.

The system control unit 201 has a CPU (Central Processing Unit or an MPU (Micro Processing Unit) for overall controlling the entire digital camera 100, and realizes, by executing the programs stored in the nonvolatile memory 256, the procedures of the flowchart that will be described later. The system memory 252 is, for example, a RAM and used also as a work memory where constants and variables for operating the system control unit 201, and the programs read out from the nonvolatile memory 256 are expanded. The system control unit 201 controls the memory 232, the D/A converter 219, the backside display unit 101, the external output I/F 290, and the like, so as to perform display control. A system timer 253 is a time measurement unit for measuring time periods for various types of controls and the time of an integrated clock.

A mode selection switch 103, a first shutter switch 261, a second shutter switch 262, and the operation units 270 are operation members for inputting various types of instructions into the system control unit 201. The mode selection switch 103 switches the operation mode of the system control unit 201 to any of a still image shooting mode, a moving image recording mode, and a reproduction mode. The still image shooting mode includes an automatic shooting mode, an automatic scene determination mode, a manual mode, aperture-priority AE mode (Av mode), shutter-priority AE mode (Tv mode). The still image shooting mode also includes various scene mode each of which scene-specific shooting setting is made, a program AE mode, a custom mode, and the like.

Using the mode selection switch 103, the mode is directly switched to any of the plurality of modes included in the still image shooting mode. Alternatively, it is also possible to switch, using the mode selection switch 103, to the still image shooting mode and then to switch, using another operation member, to any of the plurality of modes included in the still image shooting mode. Similarly, also the moving image recording mode and the reproduction mode may include a plurality of modes.

While the shutter-release button 102 provided on the digital camera 100 is being operated, that is, pressed halfway (the shooting preparation instruction), the first shutter switch 261 is turned on and generates a first shutter switch signal SW1. Upon receiving the first shutter switch signal SW1, the system control unit 201 causes the image processing unit 224 to start the AF processing, the AE processing, the AWB processing, the EF processing and the like.

When the operation of the shutter-release button 102 is completed, that is, the shutter-release button 102 is pressed fully (the shooting instruction), the second shutter switch 262 is turned on and generates a second shutter switch signal SW2. Upon receiving the second shutter switch signal SW2, the system control unit 201 starts a series of shooting processing from reading out the signal from the image capturing unit 222 to writing of image data to the recording medium 250.

By selecting items for setting various functions or items representing setting values displayed on the backside display unit 101 and the external apparatus 300, appropriate functions for each situation are assigned to the operation units 270, and the operation units 270 thus act as various function buttons. Examples of these function buttons include a menu button 270e, an end button, a back button, an image scrolling button, a jump button, a narrow-down button, and an attribute change button. For example, a menu screen that enables various settings to be made is displayed on the backside display unit 101 or the external apparatus 300 by pressing the menu button 270e. The user can make various settings intuitively by using the menu screen, which is displayed on the backside display unit 101 or the external apparatus 300, the cross key 108 and the SET button 109.

Note that it is assumed that the backside display unit 101 of the present embodiment has an image display function in SDR image quality, that is, R, G, and B color components can each be displayed in 8 bits (256 tones). Also, it is assumed that, when the external apparatus 300 is connected to the digital camera 100, the external apparatus 300 is set as an output target device to which a captured image or a live view image is to be output in place of the backside display unit 101. Also, if a user explicitly selects in which of the backside display unit 101 and the external apparatus 300 image is to be displayed by operating the operation unit 270, the selected unit or apparatus is the output target device.

The operation unit 270 is an input unit that accepts an operation made by the user and notifies the system control unit 201 of the operation, and includes at least the following operation members. The operation members are the shutter-release button 102, the main electronic dial 105, the power supply switch 106, the sub electronic dial 107, the cross key 108, the SET button 109, the live view button 110, the enlargement button 111, the reduction button 112, and the reproduction button 113. The cross key 108 is a directional button in which upper, lower, right and left portions of the cross key 108 can be pushed down. Although the description is given as an integrated operation unit in the present embodiment, an up button, a down button, a right button, and a left button may be independent buttons. Hereinafter, the upper and lower portions are referred to as an up and down key, and the left and right portions are referred to as a left and right key. Also, the operation unit 270 also includes the following operation units.

An AF-ON button 270b is a push button switch included in the operation unit 270, and execution of AF can be instructed by pushing down the button. The pushing down direction of the AF-ON button 270b is parallel to the direction of subject light that is incident on the image capturing unit 222 from the lens unit 200 (optical axis).

The quick setting button 270c (hereinafter, Q button 270c) is a push button switch included in the operation unit 270, and a quick setting menu, which is a list of setting items that can be set in each operation mode, is displayed by pushing down the button. For example, if the button is pushed down while being in shooting standby in the live view shooting, a list of setting items such as an electronic front curtain shutter, brightness of the monitor, WB of the LV screen, two-point enlargement, and soundless shooting are displayed in a line so as to be superimposed on the LV. The user can change the setting relating to the selected setting item or shift the mode to the selected operation mode by selecting, from the displayed quick setting menu, a desired option using the up and down key, and pushing down the set button.

The active frame selection button 270d is a push button switch included in the operation unit 270, and with which active enlarged position (frame) can be switched between two enlarged positions. Also, the active frame selection button 270d is assigned with different functions in accordance with the operation mode, and upon being pushed down in the reproduction mode, a protect attribute can be given to the image being displayed.

The menu button 270e is a push button switch included in the operation unit 270, and by operating this button, a menu screen on which various settings can be performed is displayed in the backside display unit 101 or the external apparatus 300.

The function button 270f includes three push button switches that are included in the operation unit 270 and are assigned with respective functions. Each of the three buttons of the function button 270f is arranged at a position operable by a finger (middle finger, third finger, or little finger) of the right hand that holds the grip 115, and the pushing down direction is parallel to the direction of subject light that is incident on the image capturing unit 222 from the lens unit 200 (optical axis).

The info button 270g is a push button switch included in the operation unit 270, and is used to switch between various types of information displays.

A power control unit 280 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 280 controls the DC-DC converter in accordance with the detection results and an instruction of the system control unit 201, and supplies a necessary voltage for a necessary length of time to each of the units including the recording medium 250.

A power supply unit 230 comprises a primary battery such as an alkaline battery or a lithium battery, a secondary battery such as a NiCd battery, a NiMH battery, or a Li-ion battery, or an AC adaptor. A recording medium interface (I/F) 218 is for interfacing with the recording medium 250 such as a memory card or a hard disk drive. The recording medium 250 is a recording medium such as a memory card for recording shot images, and constituted by a semiconductor memory, a magnetic disk, or the like.

The communication unit 254 is wirelessly connected or connected by a cable, and transmits and receives a video signal, an audio signal, and the like. The communication unit 254 can also connect to a wireless LAN (Local Area Network) and the Internet. An image transfer protocol such as FTP (File Transfer Protocol), PTP (Picture Transfer Protocol), or PTP-IP (Picture Transfer Protocol over Internet Protocol) is envisioned as the communication protocol. Since it is envisioned that a known technique is to be used, the protocol is not specifically limited in the present embodiment. The communication unit 254 can transmit images (including through images) captured by the image capturing unit 222 and image files recorded in the recording medium 250, and can receive image files and various types of information from an external apparatus.

An attitude detection unit 255 detects the attitude (orientation) of the digital camera 100 with respect to the gravity direction. In this case, based on the attitude detected by the attitude detection unit 255, it is possible to discriminate whether an image captured by the image capturing unit 222 has been shot by setting the digital camera 100 in the landscape or portrait direction. The system control unit 201 can add information about the orientation information corresponding to the attitude detected by the attitude detection unit 255 to the image file of an image captured by the image capturing unit 222, and rotate and record the captured image. An acceleration sensor, gyro sensor and the like may be used as an attitude detection unit 255.

Included among the operation units 270 is also a touch panel (touch screen) 270a that is capable of detecting a touch operation on the backside display unit 101. The touch panel 270a and the backside display unit 101 can be constructed as a single integrated unit. For example, the touch panel 270a is constructed in such a manner that the transmittance of light will not interfere with the display presented by the backside display unit 101, and it is attached to the uppermost layer of the display face of the backside display unit 101. In addition, input coordinates on the touch panel 270a and display coordinates on the backside display unit 101 are correlated. As a result, a GUI can be constructed that makes it possible for the user to directly manipulate the screen displayed on the backside display unit 101. The system control unit 201 is capable of detecting the following touch operations and conditions performed by contacting the touch panel 270a.

Newly touching of the touch panel 270a by a finger or pen which has not been in contact with the touch panel 270a, that is a start of the touch (referred to as "touch-down" below).

A state in which the touch panel 270a is in contact with a finger or pen (referred to as "touch-on" below).

Movement of a finger or pen while in contact with the touch panel 270a (referred to as "touch-move" below).

Lifting of a finger or pen that has been in contact with the touch panel 270a, that is an end of the touch (referred to as "touch-up" below).

A state in which the touch panel 270a is not being touched at all (referred to as "touch-off" below).

When touch-down is detected, the touch-on state is also detected at the same time. Unless touch-up is detected after touch-down, touch-on usually continues to be detected. Touch-move is also detected in a state where touch-on is being detected. Even if touch-on is being detected, touch-move is not detected unless the touch position moves. After touch-up of all the fingers or a pen that have been in contact is detected, the touch-off state is entered.

These operations/conditions and position coordinates at which the touch panel 270a is being touched by the finger or pen are communicated to the system control unit 201 through an internal bus and, based upon the information thus communicated, the system control unit 201 determines what kind of operation (touch operation) was performed on the touch panel 270a. As for "touch-move", the determination can be made also for every vertical component and horizontal component with regard to the direction of movement of the finger or pen, which is moved on the touch panel 270a, based upon a change in the coordinate position. Further, the system control unit 201 can determine that a slide operation (drag) has been performed if it detects a touch-move over a predetermined distance. An operation in which a finger is touched against the touch panel, swiftly moved a certain distance, and then lifted away will be referred to as a "flick". In other words, a flick is an operation in which a finger is swiftly flicked across the touch panel 270a. If a touch-move with a predetermined distance or higher and a predetermined speed or higher is detected, and then a touch-up is detected, it can be determined that a flick has been performed (it can be determined that a flick was performed in succession to a drag). Furthermore, a touch operation in which the touch panel is touched at multiple locations (for example, two points) at the same time, and then the touch positions are moved closer to each other will be referred to as a "pinch-in", and a touch operation in which the touch positions are moved away from each other will be referred to as a "pinch-out". Pinch-out and pinch-in operations will be collectively referred to as "pinch operations" (or simply "pinching").

The touch panel 270a may employ a method that relies upon any of the following: resistive film, electrostatic capacitance, surface acoustic waves, infrared radiation, electromagnetic induction, image recognition and optical sensing. There are methods in which a touch is detected based on contact with the touch panel, as well as methods in which a touch is detected based on approach of a finger or a pen to the touch panel, and any method may be employed.

The present invention is not limited to an image capturing apparatus main body, and can also be applied in a control apparatus that communicates with an image capturing apparatus (including a network camera) through wired or wireless communication and remotely controls the image capturing apparatus. Apparatuses such as a smartphone, which is a type of mobile phone, a tablet PC, a desktop PC, and the like can be given as examples of control apparatuses that remotely control an image capturing apparatus. The image capturing apparatus can be controlled remotely by the control apparatus communicating commands for carrying out various types of operations, settings to the image capturing apparatus, and the like on the basis of operations made in the control apparatus, processes carried out by the control apparatus, and the like. Additionally, a live view image shot by the image capturing apparatus may be received by the control apparatus through wired or wireless communication and displayed.

Note that, in the present embodiment, a case has been described where the present invention is applied to a digital camera as an example, but the present invention is not limited to this example. That is, the present invention can be applied to an apparatus that includes a display unit and can transfer data to an external apparatus, such as a PDA (Personal Digital Assistant), a mobile phone terminal, a mobile image viewer, a printer apparatus including a display, a digital photo frame, a music player, a game machine, or an electronic book reader.

LV Display Processing

Next, the LV display processing of the present embodiment will be described with reference to FIGS. 3 and 4.

Figure 3:
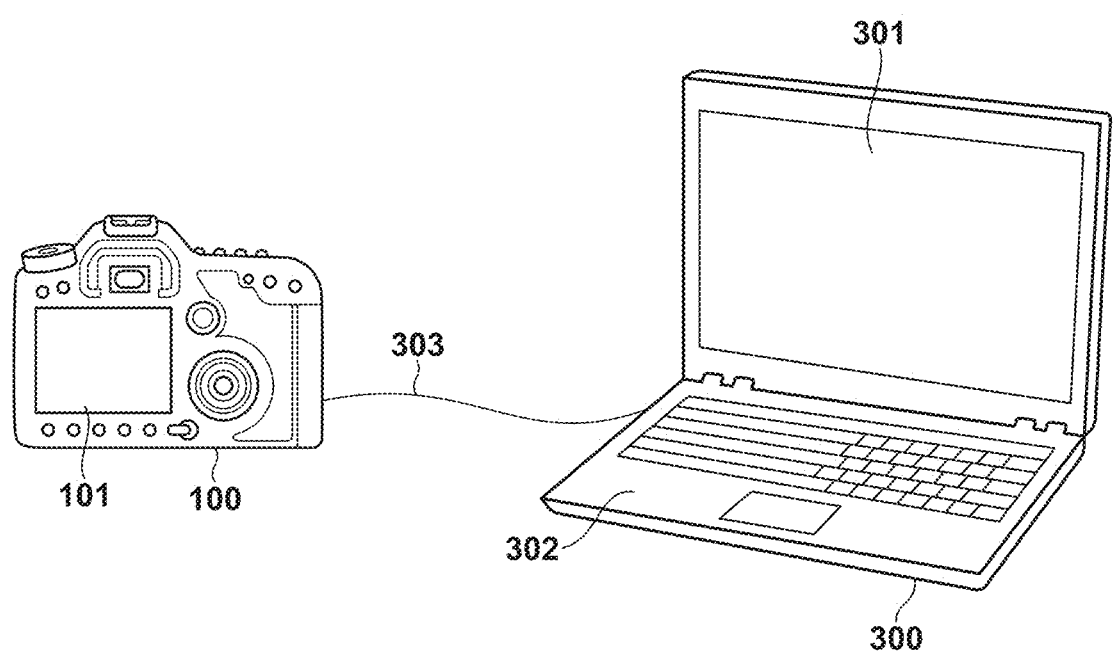
FIG. 3 is a diagram illustrating an exemplary connection between apparatuses of the present embodiment.

FIG. 3 illustrates an example in which the digital camera 100 and the external apparatus 300 are connected. The digital camera 100 and the external apparatus 300 are connected by a connection cable 303, and the digital camera 100 is set to an LV shooting mode. Display similar to the LV display displayed in the backside display unit 101 of the digital camera 100 is displayed in the display 301 of the external apparatus 300 via an application software of the external apparatus 300.

Figure 4:
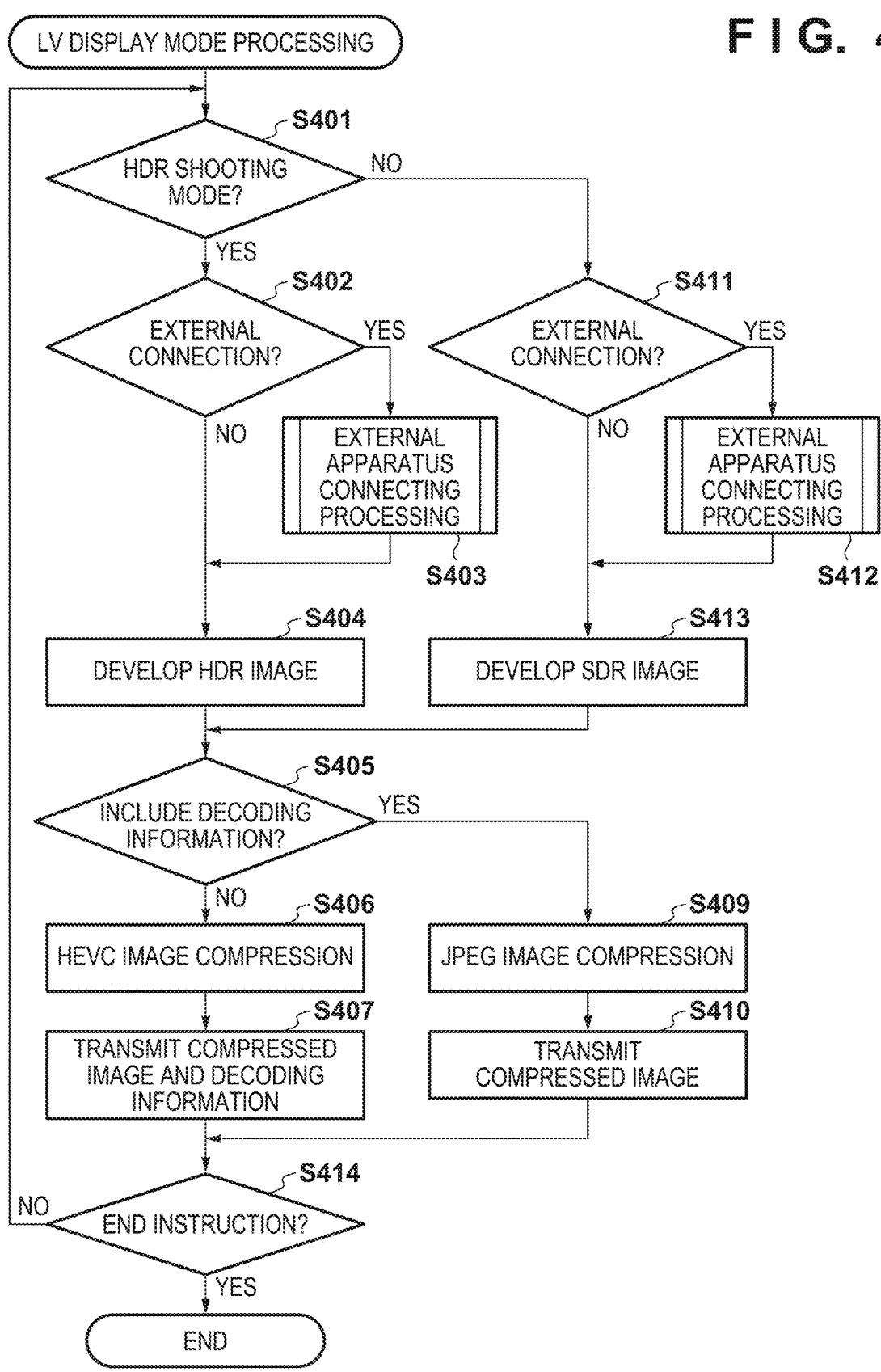
FIG. 4 is a flowchart illustrating live view display processing of the present embodiment.

FIG. 4 illustrates LV display mode processing when the digital camera 100 and the external apparatus 300 are connected. Note that the processing in FIG. 4 is realized by the system control unit 201 deploying a program recorded in the nonvolatile memory 256 in the system memory 252 and executing the program. The same applies to FIGS. 6A and 6B, which will be described later.

First, the HDR shooting mode and the SDR shooting mode in the present embodiment will be described. The HDR shooting mode or the SDR shooting mode can be set to the digital camera 100 of the present embodiment by the user's menu operation or the like. These modes are modes for setting which of HDR image quality image data or SDR image quality image data the user will finally obtain, and various types of control will be performed in the processing described below in accordance with the set mode. In the following, performing shooting in the HDR shooting mode and the SDR shooting mode may also be described as "HDR shooting" and "SDR shooting". Note that because a setting can be configured such that image data in only the RAW format is recorded, as described later, even if shooting is performed in the HDR shooting mode, an HDR image is not necessarily recorded.

In step S401, the system control unit 201 determines whether or not the shooting mode corresponding to the user operation is set to the HDR shooting mode. The system control unit 201, upon determining that the HDR shooting mode is set, advances the processing to step S402, and upon determining that the SDR shooting mode is set, advances the processing to step S422.

In step S402, the system control unit 201 determines whether or not the external apparatus 300 is connected to the digital camera 100. The system control unit 201, upon determining that the external apparatus 300 is connected, advances the processing to step S403, and upon determining that the external apparatus 300 is not connected, advances the processing to step S404.

In step S403, the system control unit 201 performs connecting processing for connecting the digital camera 100 and the external apparatus 300. Then, the system control unit 201 advances the processing to step S404. The connecting processing will be described later with reference to FIG. 5.

In step S404, the system control unit 201 performs HDR image quality development processing on the RAW image data that has been obtained by capturing performed by the image capturing unit 222 and has been converted to a digital signal by the A/D converter 223 using the image processing unit 224. In the following, the image obtained by the HDR image quality development processing is referred to as an HDR image.

Note that the HDR image data in the embodiment refers to data in which one pixel is constituted by three components (such as Luv or YCbCr), and each component is represented by 10 bits (1024 tones), in the embodiment. An HDR image gamma curve (e.g. PQ and HLG in ITU-R Recommendation BT.2100) is applied in the HDR image data.

In step S405, the system control unit 201 determines whether or not the format of image to be compression-encoded includes decoding information in the image data. The system control unit 201, upon determining that decoding information is not included, advances the processing to step S406, and upon determining that decoding information is included, advances the processing to step S409.

Figure 10A:
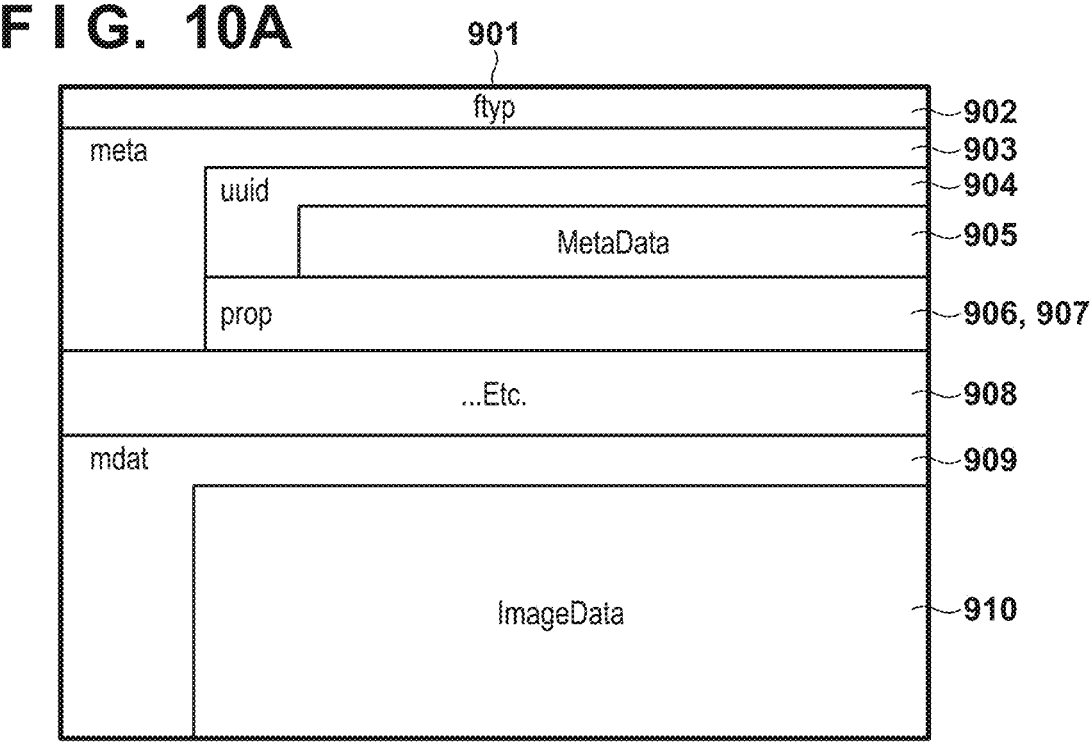
FIGS. 10A and 10B are diagrams illustrating an example of the image file format of the present embodiment.

FIG. 10A shows an example of HEIF (High Efficiency Image File Format) as an image file format in which DecodeData 907 is not included in ImageData 910. An image file 901 includes a box ftyp 902 for describing the file type at the head, a box meta 903 including all pieces of metadata, a box mdat 909, which is a media data body of a track, and a box 908 for other items. The box meta 903 includes a box uuid 904 for storing MetaData 905 and a box prop 906 for storing DecodeData 907 as child elements. Metadata of an image is described in the MetaData 905. The metadata is constituted by created date and time, condition at shooting, information indicating HDR or SDR, detection metadata and other shooting information with respect to the image, for example. In the DecodeData 907, data for decoding the ImageData 910 is described, and the DecodeData 907 is constituted by VPS (VideoParameterSet), SPS (SequenceParameterSet), PPS (PictureParameterSet), and the like. The box mdat 909 has the ImageData 910, which is compressed image data of the shot image, as a child element. The ImageData 910 is constituted only by image data that is compression-encoded by HEVC, and therefore the ImageData 910 cannot be decoded unless being combined with the DecodeData 907. In the present embodiment, as a result of transmitting only the DecodeData 907 and the ImageData 910 instead of the entirety of the image file 901, the display in the external apparatus 300 can be accelerated.

Figure 10B:
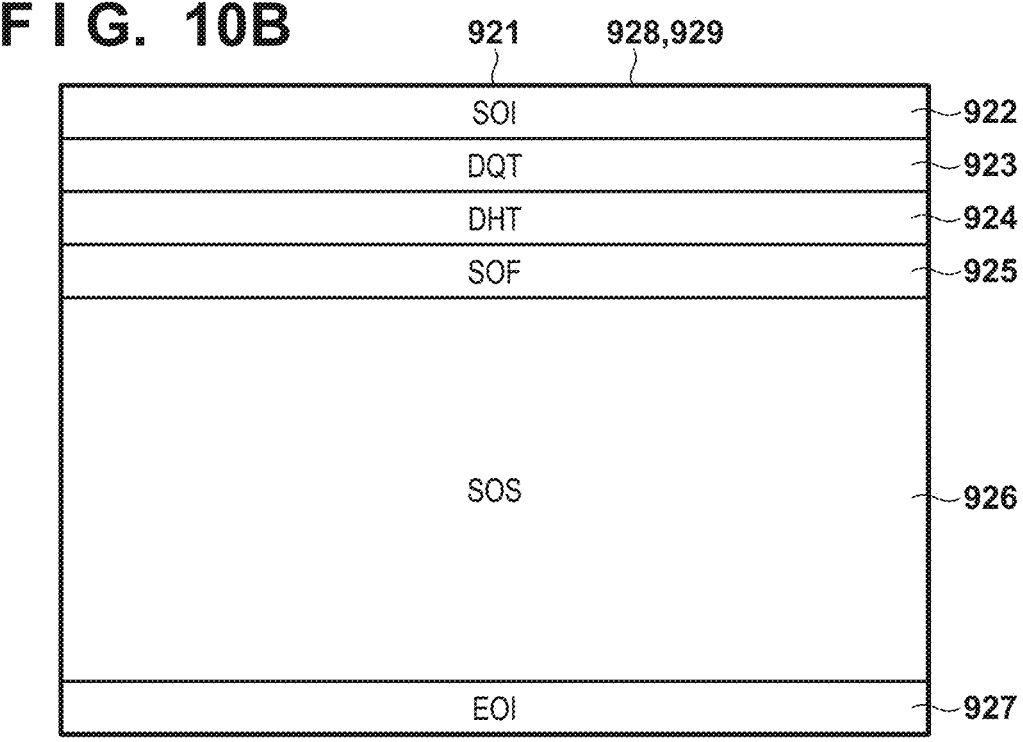

FIG. 10B shows an example of JPEG format as an image file format in which DecodeData 929 is included in ImageData 928. The image file 921 includes a marker SOI (Start Of Image) 922 indicating the start of data. A marker DQT (Define Quantization Table) 923 for storing a quantization table, and a marker DHT (Define Huffman Table) 924 for storing a Huffman table are included. A marker SOF (Start Of Frame) 925 for storing parameters relating to a frame, and a marker SOS (Start Of Scan) 926 for storing parameters relating to a component are included. A marker EOI (End Of Image) 927 indicating the end of the data is included. The image file 921 included the DecodeData 929 for decoding the ImageData 928, and when the image file 921 is transmitted to the external apparatus 300, the external apparatus 300 can decode and display the image file 921.

Returning to FIG. 4, in step S406, the system control unit 201 generates the ImageData 910 by compression-encoding the HDR image into the HEVC format using the image processing unit 224, and outputs the ImageData 910 to the memory 232. In this case, the decoding information needed to display the ImageData 910 has been output to the memory 232 as the DecodeData 907, which is data different from the ImageData 910.

In step S407, the system control unit 201 transmits the ImageData 910 and the DecodeData 907 to the external apparatus 300 via the external output I/F 290. The external apparatus 300 generates display image using the data received from the digital camera 100, and display the display image in the display 301 of the external apparatus 300.

In step S409, the system control unit 201 generates the ImageData 928 by compression-encoding the HDR image into the JPEG format using the image processing unit 224, and outputs the ImageData 928 to the memory 232. In this case, the decoding information needed to display the ImageData 928 is embedded in the ImageData 928 as the DecodeData 929.

In step S410, the system control unit 201 transmit the ImageData 928 including the DecodeData 929 to the external apparatus 300 via the external output I/F 290.

In step S411, the system control unit 201 determines whether or not the external apparatus 300 is connected to the digital camera 100. The system control unit 201, if it is determined that the external apparatus 300 is connected, advances the processing to step S412, and if not, advances the processing to step S413.

In step S412, the system control unit 201 performs connecting processing for connecting the digital camera 100 and the external apparatus 300, and advances the processing to step S413. The connecting processing will be described later with reference to FIG. 5.

In step S413, the system control unit 201 develops the image that was captured by the image capturing unit 222 and has been converted to a digital signal by the A/D converter 223 to data of SDR image quality (three components per pixel, 8 bits (256 tones) per component) using the image processing unit 224, and advances the processing to step S405. Note that, in the following, the image subjected to the development processing of SDR image quality is referred to as an SDR image. Here, the image data (SDR image data) of SDR image quality in step S413 refers to image data of 8 bits per component. An SDR image gamma curve (e.g., gamma curve of the sRGB standard) has been applied to the image data of SDR image quality. Note that the gamma curve of the sRGB standard is, in general, a straight line in the dark portion, and a curve of power of 2.4 in the bright portion, but a curve of power of 2.2 may be used in a simplified manner.

In step S414, the system control unit 201 determines whether or not an end instruction to end the LV mode has been made, and if it is determined that the end instruction to end the LV mode has not been made, returns the processing to step S401, and if it is determined that the end instruction has been made, ends this processing.

Note that the determination processing in step S606 in the LV shooting processing in FIG. 6A, which will be described later, may be performed in addition to the determination processing in step S405 in FIG. 4.

Figure 5:
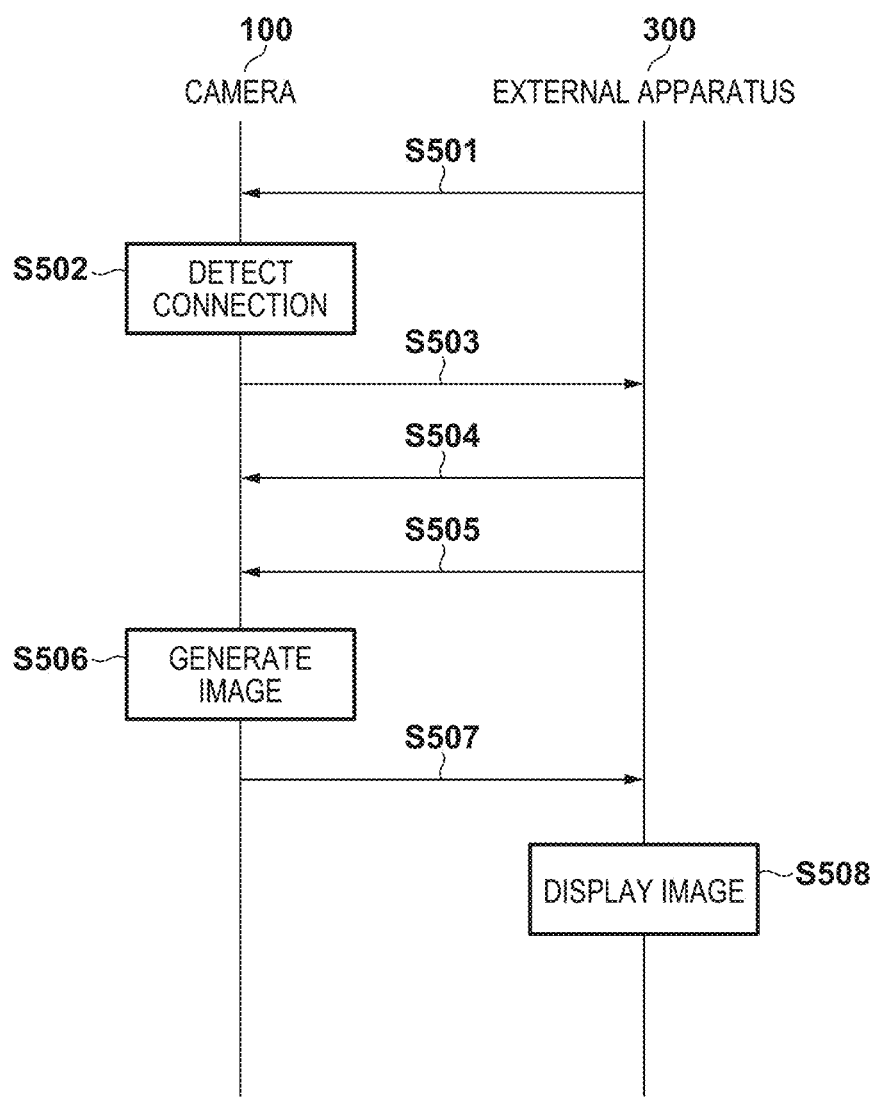
FIG. 5 is a sequence diagram of connecting processing of the present embodiment.

FIG. 5 shows a communication procedure between the digital camera 100 and the external apparatus 300 when the digital camera 100 and the external apparatus 300 are connected. Here, the description will be given assuming that the digital camera 100 and the external apparatus 300 are connected through the USB interface.

In step S501, the external apparatus 300 starts transmitting a VBUS signal through a VBUS signal line (not illustrated) of the connection cable 303. The external output I/F 290 of the digital camera 100 receives the transmitted VBUS signal through the connection cable 303. The external output I/F 290, upon receiving the VBUS signal, notifies the system control unit 201 of the reception of the VBUS signal.

In step S502, the system control unit 201 detects the connection response from the external apparatus 300 by the notification of VBUS, and advances the processing to step S503.

In steps S503 and S504, the system control unit 201 performs enumeration processing with the external apparatus 300 by controlling the external output I/F 290, and completes the connection by means of PTP (Picture Transfer Protocol).

In step S505, the external apparatus 300 performs a request to acquire an image to the digital camera 100.

In step S506, the system control unit 201 performs the processing described with reference to FIG. 4, and generates the image to be transmitted.

In step S508, the external apparatus 300 displays the image received from the digital camera 100. By repeating the processing from step S505 to step S508, temporally continuous images can be displayed such as the LV display.

In this way, the digital camera 100 of the present embodiment can switch the data to be transmitted to the external apparatus 300 based on whether or not the image data (ImageData 910, 928) includes decoding information (DecodeData 907, 929).

LV Shooting Processing

Next, the LV shooting processing of the present embodiment will be described with reference to FIGS. 6A and 6B. Note that, in the following, the steps in which the processing similar to that in FIG. 4 is performed are given the same reference signs, and the description thereof will be omitted.

Figure 6A:
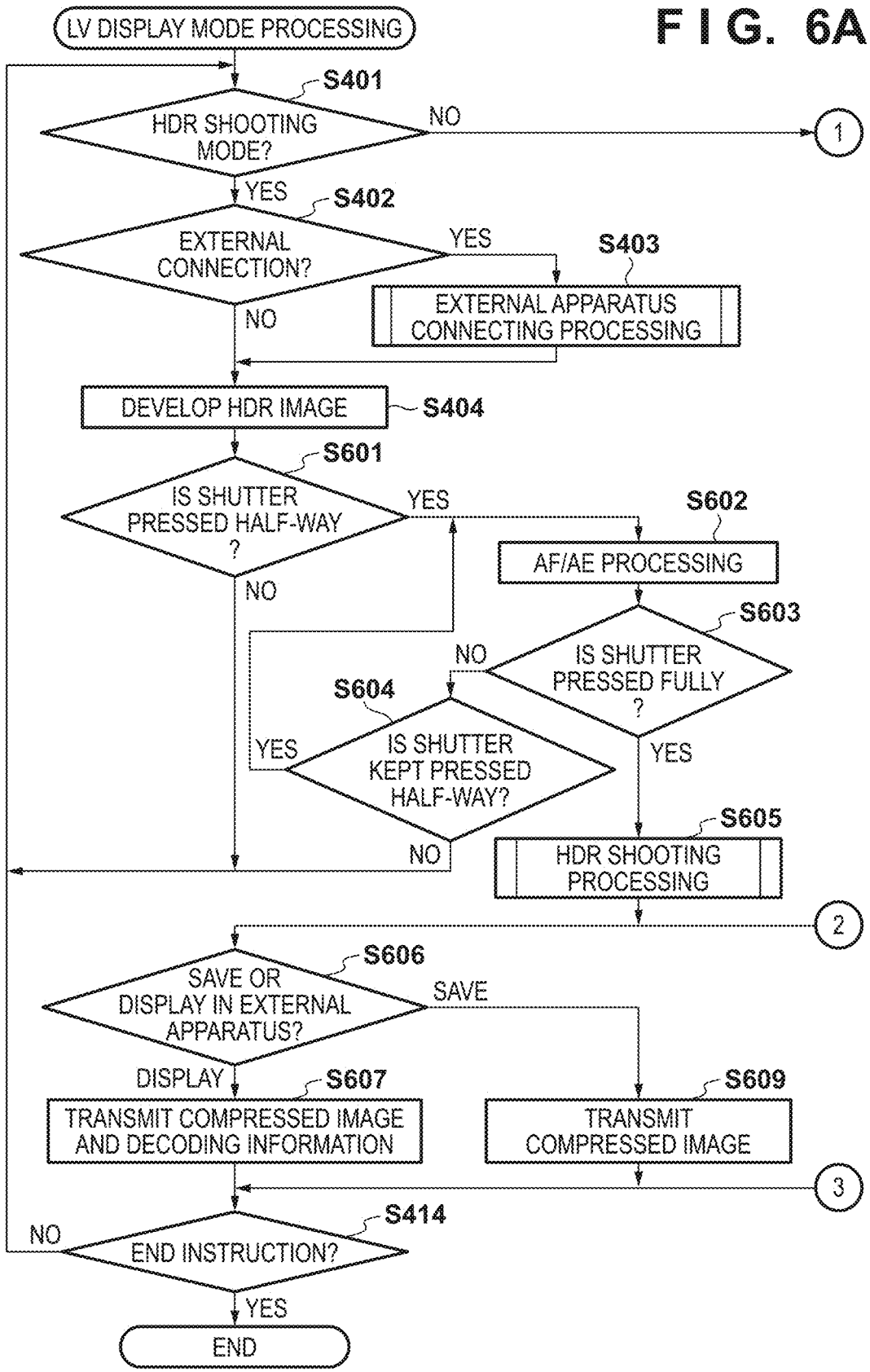
FIGS. 6A and 6B are flowcharts illustrating live view shooting processing of the present embodiment.
Figure 6B:
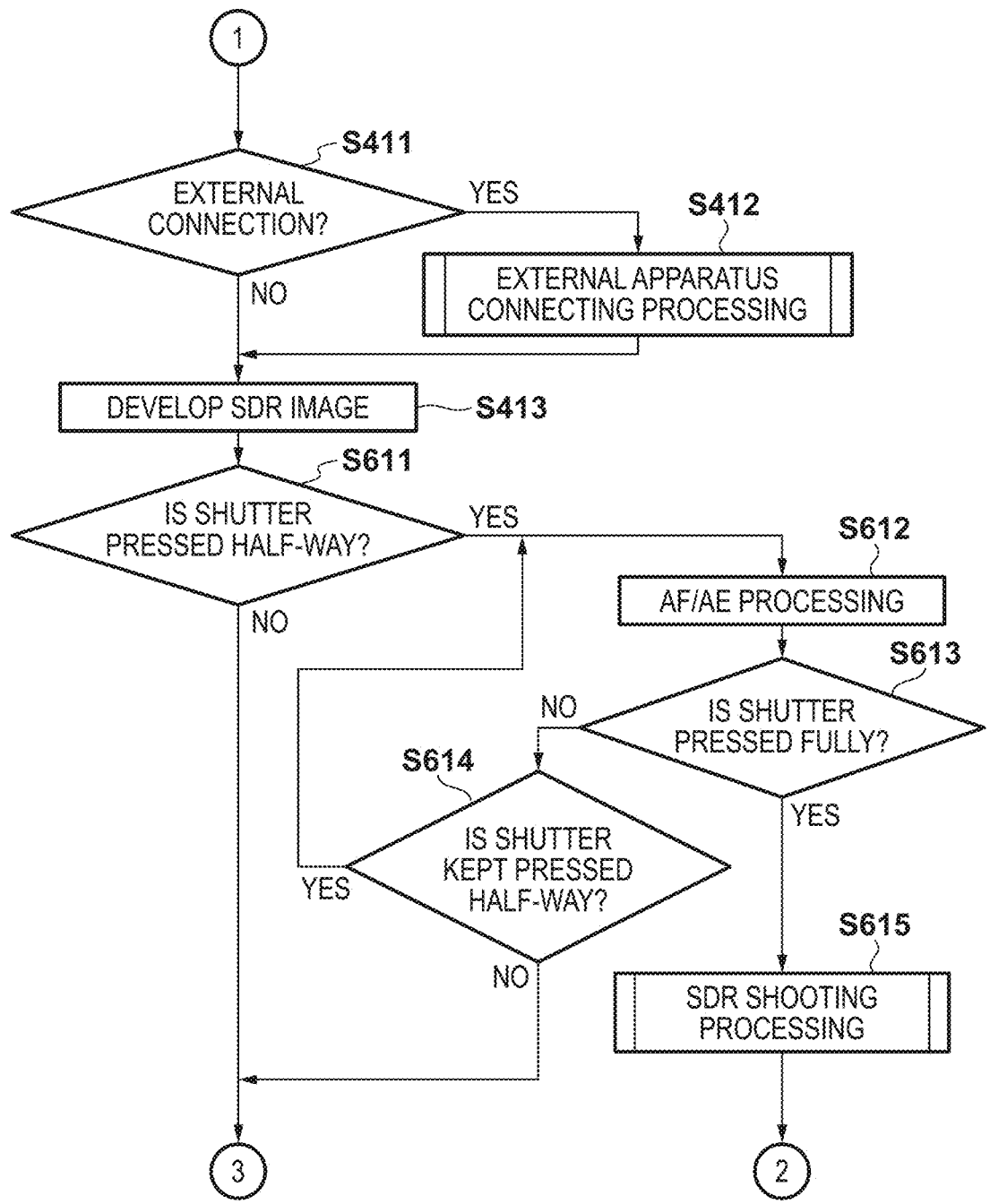

In contrast to the fact that the LV display processing in FIG. 4 is processing for displaying images shot by the digital camera 100 in the apparatus 300 in live view, the LV shooting processing in FIGS. 6A and 6B is processing for displaying or saving the images that have been shot by the digital camera 100 and recorded, in the external apparatus 300.

In step S601, the system control unit 201 determines whether or not the shutter-release button 102 is in a half-way pressed state based on whether or not the first shutter switch signal SW1 has being received. The system control unit 201, if it is determined that the shutter-release button 102 is not pressed half-way, advances the processing to step S401, and if it is determined to be in a half-way pressed state, advances the processing to step S602.

In step S602, the system control unit 201 performs the AF/AE processing described with reference to FIG. 2, and advances the processing to step S603.

In step S603, the system control unit 201 determines whether or not the shutter-release button 102 is in a fully pressed state based on whether or not the second shutter switch signal SW2 has been received. The system control unit 201, if it is determined to be not in a fully pressed state, advances the processing to step S604, and if it is determined to be in a fully pressed state, advances the processing to step S605.

In step S604, the system control unit 201 determines whether the shutter-release button 102 is kept in a half-way pressed state, and if the shutter-release button 102 is kept in a half-way pressed state, returns the processing to step S602, and if it is determined that the shutter-release button 102 is not kept in a half-way pressed state, returns the processing to step S401.

In step S605, the system control unit 201 performs HDR shooting processing, and records an image file in accordance with the recording format that has been set in the recording medium 250 in advance. FIG. 10A shows a data structure of the file to be recorded. Note that the HDR shooting processing will be described later with reference to FIG. 7. Also, the system control unit 201 advances the processing to step S606.

In step S606, the system control unit 201 determines whether the image file 901 generated in step S605 is to be saved or displayed in the external apparatus 300. The system control unit 201, if it is determined to be displayed in the external apparatus 300, advances the processing to step S607, and if it is determined to be saved, advances the processing to step S609. The system control unit 201 can determine whether or not the external apparatus 300 will save the image file received from the digital camera 100 based on which of the image display request or the image saving request the digital camera 100 has received from the external apparatus 300.

In step S607, the system control unit 201 transmits the ImageData 910 and the DecodeData 907 to the external apparatus 300 via the external output I/F 290. The external apparatus 300 generates a display image using the data received from the digital camera 100, and displays the display image in the display 301 of the external apparatus 300. In the present embodiment, as a result of transmitting only the DecodeData 907 and the ImageData 910 instead of the entirety of the image file 901, the display in the external apparatus 300 can be accelerated.

In step S609, the system control unit 201 transmits the image file 901 generated in step S605 to the external apparatus 300 via the external output I/F 290. The external apparatus 300 saves the image file received from the digital camera 100 in the storage apparatus 302 of the external apparatus 300. In the present embodiment, as a result of transmitting the image file 901 in the file format, the external apparatus 300 can save an image file having high compatibility.

In step S611, the system control unit 201 determines whether or not the shutter-release button 102 is in a half-way pressed state, and if it is determined to be not in a half-way pressed state, advances the processing to step S401, and if it is determined to be in a half-way pressed state, advances the processing to step S612.

In step S612, the system control unit 201 performs the AF/AE processing described with reference to FIG. 2, and advances the processing to step S432.

In step S613, the system control unit 201 determines whether or not the shutter-release button 102 is in a fully pressed state based on whether or not the second shutter switch signal SW2 has been received. The system control unit 201, if it is determined to be not in a fully pressed state, advances the processing to step S612, and if it is determined to be in a fully pressed state, advances the processing to step S615.

In step S614, the system control unit 201 determines whether or not the shutter-release button 102 is kept in a half-way pressed state based on whether or not the first shutter switch signal SW1 has been received. The system control unit 201, if it is determined that the shutter-release button 102 is kept in a half-way pressed state, returns the processing to step S612, and if it is determined that the shutter-release button 102 is not kept in a half-way pressed state, advances the processing to step S414.

In step S615, the system control unit 201 performs SDR shooting processing, and advances the processing to step S606. In the SDR shooting processing, the system control unit 201 performs development processing on the RAW image data obtained in SDR shooting of SDR image quality, and generates JPEG image data by performing JPEG compression-encoding on the SDR image, and records the JPEG image data in the recording medium 250 as a file in the JPEG format. FIG. 10B shows a data structure of the file to be recorded.

In the case of an SDR image, in step S606, the system control unit 201, regardless of whether the image file generated in step S615 is to be saved or to be displayed in the external apparatus 300, transmits the image file to the external apparatus 300 in step S609. The external apparatus 300 stores the JPEG image data received from the digital camera 100 in the storage apparatus 302, or decodes and displays the JPEG image data in the display 301.

In this way, the digital camera 100 can switch the data to be transmitted to the external apparatus 300 based on whether the compression-encoded image file 901 is to be displayed or to be saved in the external apparatus 300.

Note that the determination processing in step S405 in the LV display processing in FIG. 4 and the determination processing in step S606 in the LV shooting processing in FIG. 6A may be combined. In this case, the configuration may be such that, if it is determined, in step S606, that the external apparatus 300 will display the HDR image or the SDR image received from the digital camera 100, the determination in step S405 in FIG. 4 is performed, and the processing from step S406 to step S409 is performed.

HDR Shooting Processing

Next, the HDR shooting processing in step S605 in FIG. 6A will be described with reference to FIG. 7.

In the HDR shooting processing, the image processing unit 224 performs the development processing of HDR image quality on the RAW data written into the memory 232.

The image capturing apparatus such as a digital camera or a digital video camera has a white balance function of correcting the color tone of a shot image based on the light source at the time of shooting. The white balance function corrects the difference in color tone that changes in accordance with the light source (natural light source in fine weather or cloudy weather, artificial light sources such as a fluorescent light and an incandescent lamp) such that the white can be seen as the same white regardless of the light source. In steps S701 to S703, white balance coefficients needed in the white balance processing are calculated. Also, in the present embodiment, it is assumed that shooting is performed at an exposure that is lower than the exposure at which the brightness of a person or the like is appropriate, in order to not cause blown out highlights in a high luminance region such as the sky as much as possible.

In step S701, the system control unit 201 acquires RAW image data via the memory control unit 215.

In step S702, the system control unit 201 performs "processing for determining whether inside a white search frame" in order to determine pixels that are likely to be white with respect to RAW image data acquired in order to calculate the white balance coefficients.

In step S703, the system control unit 201 calculates the white balance coefficients based on the result of "determination as to whether inside a white search frame".

Figure 11:
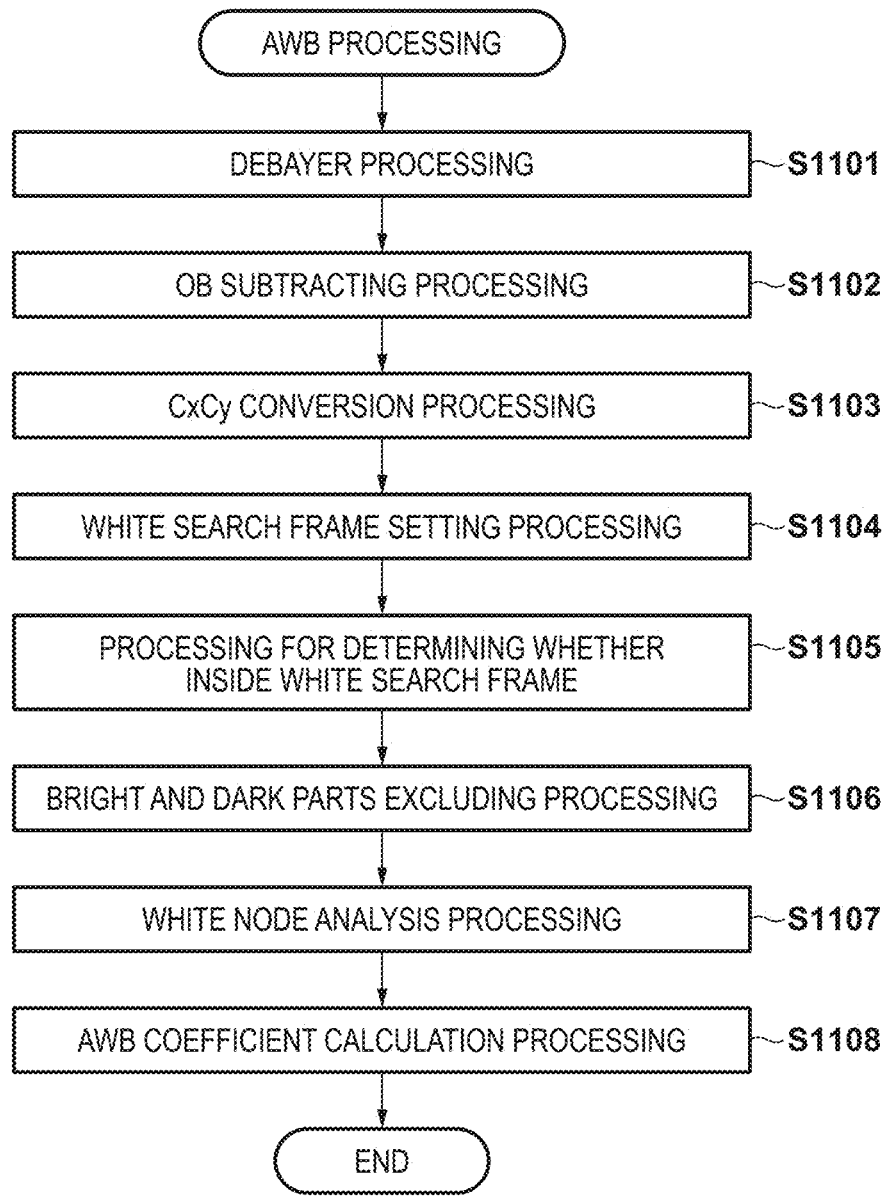
FIG. 11 is a flowchart illustrating white balance processing of the embodiment.

The details of the processing in steps S702 and S703 will be described using the flowchart in FIG. 11.

In the RAW image data, one pixel has a signal of only one of the R, G, and B components, as described above. In order to perform white search, conversion to color signals needs to be performed, and therefore the system control unit 201 performs debayering processing (step S1101) so as to generate signals of all of the R, G, and B channels per one pixel. There are several debayering methods, and signals can be generated by performing linear interpolation using a lowpass filter, for example. The RAW image data is generally influenced by noise, and the optical black (OB) is not 0 and has a value. Therefore, the system control unit 201 performs processing for subtracting the value of OB from the debayered signals (step S1102). Also, the system control unit 201 calculates color signals Cx and Cy from the acquired RGB signals using Equation 1 (step S1103).

$$Cx = \{(R+G2)-(R+G1)\}/Yi \qquad \text{Equation 1}$$
$$Cy = \{(R+B)-(G1+G2)\}/Yi$$
$$Yi = (R+G1+G2+B)/4$$

G1 and G2 are two G component values in 2×2 pixels in the Bayer arrangement. Also, Cx represents the color temperature, and Cy represents the correction amount in a green direction. Also, Yi is a luminance value.

Figure 12:
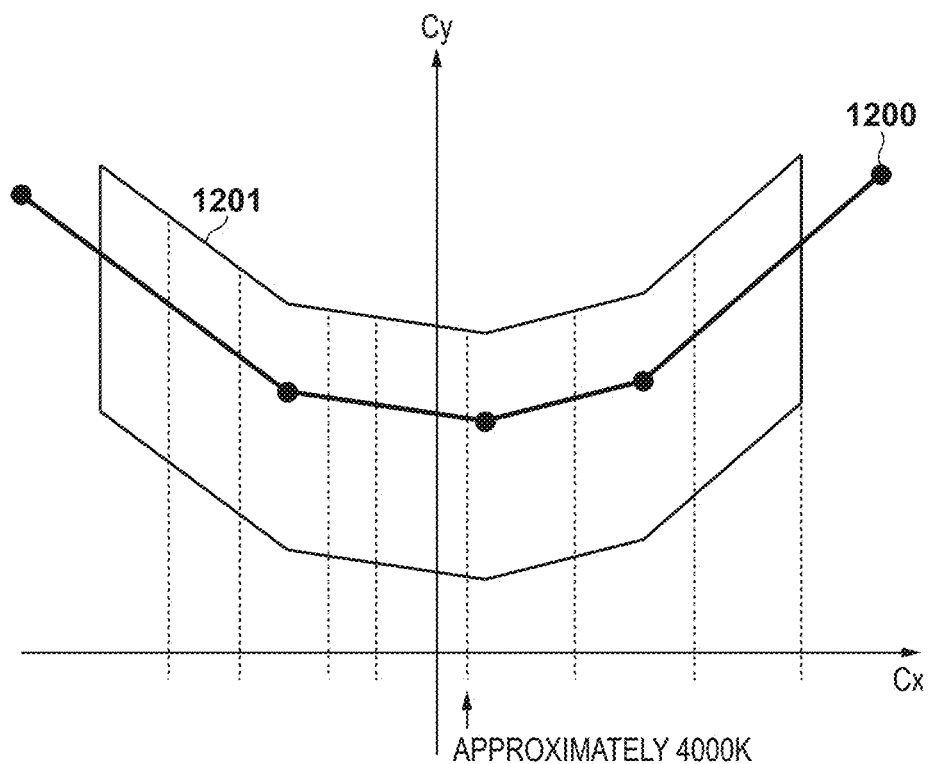
FIG. 12 is a diagram illustrating a Cx-Cy plane.

A Cx-Cy plane is shown in FIG. 12. As shown in FIG. 12, a white color is shot by the image capturing apparatus at a color temperature in a region from a high color temperature (e.g., daytime) to a low color temperature (e.g., at sunset) in advance, color evaluation values Cx and Cy are plotted on coordinates, and with this, a white axis 1200 that serves as a reference for detecting the white color can be determined. Because a small variation is present in the white color under an actual light source, the system control unit 201 allows the white axis 1200 to have width on both sides to some degree (step S1104). The frame obtained by allowing the white axis to have width is referred to as a white search frame 1201.

In step S1105, the system control unit 201 plots each pixel subjected to debayering in the Cx-Cy coordinate system, and determines whether or not the plotted point is inside the white search frame. In step S1106, the system control unit 201 performs processing for excluding bright and dark parts in order to limit, in a luminance direction, the pixels to be integrated, with respect to the pixels inside the white search frame. A color that is too dark is easily influenced by noise, and therefore this processing is performed in order to prevent the calculation accuracy of the white balance coefficients from degrading. Similarly, with respect to a color that is too bright, the balance of the ratio R/G or B/G is lost because the sensor of one of the channels is saturated and the plotted point separates form the correct color, and therefore the processing is performed in order to prevent the calculation accuracy of the white balance coefficients from degrading. Here, the luminance of pixels that will be excluded by the processing for excluding bright and dark parts is differentiated between SDR and HDR. That is, different pixels are used when calculating the later-described white balance coefficients between SDR and HDR. This is because HDR has higher reproducibility in the high luminance region relative to SDR. In the present embodiment, in SDR, pixels having brightness up to +1 EV on the bright side are to be used, on the other hand, in HDR, pixels having brightness up to +2 EV are to be used, for example, and therefore, the white balance coefficients optimized for HDR can be calculated.

In step S1107, the system control unit 201 calculates integrated values SumR, SumG, and SumB of the respective color evaluation values of the points, in the Cx-Cy plane, that are inside the white search frame and are obtained by excluding bright and dark parts. Also, in step S1108, the system control unit 201 calculates white balance coefficients WBCoR, WBCoG, and WBCoB from the calculated integrated values using Equation 2.

$$WBCoR = (SumY \times 1024)/SumR$$
$$WBCoG = (SumY \times 1024)/SumG$$
$$WBCoB = (SumY \times 1024)/SumB$$
$$SumY = (SumR + 2 \times SumG + SumB)/4$$

Equation 2

"1024" on the right sides in Equation 2 is due to the one color component having 10-bit accuracy.

Note that the white balance coefficients for the shooting mode (SDR shooting or HDR shooting) set by the user may be calculated, or the white balance coefficients for both of SDR and HDR may be calculated.

Figure 13:
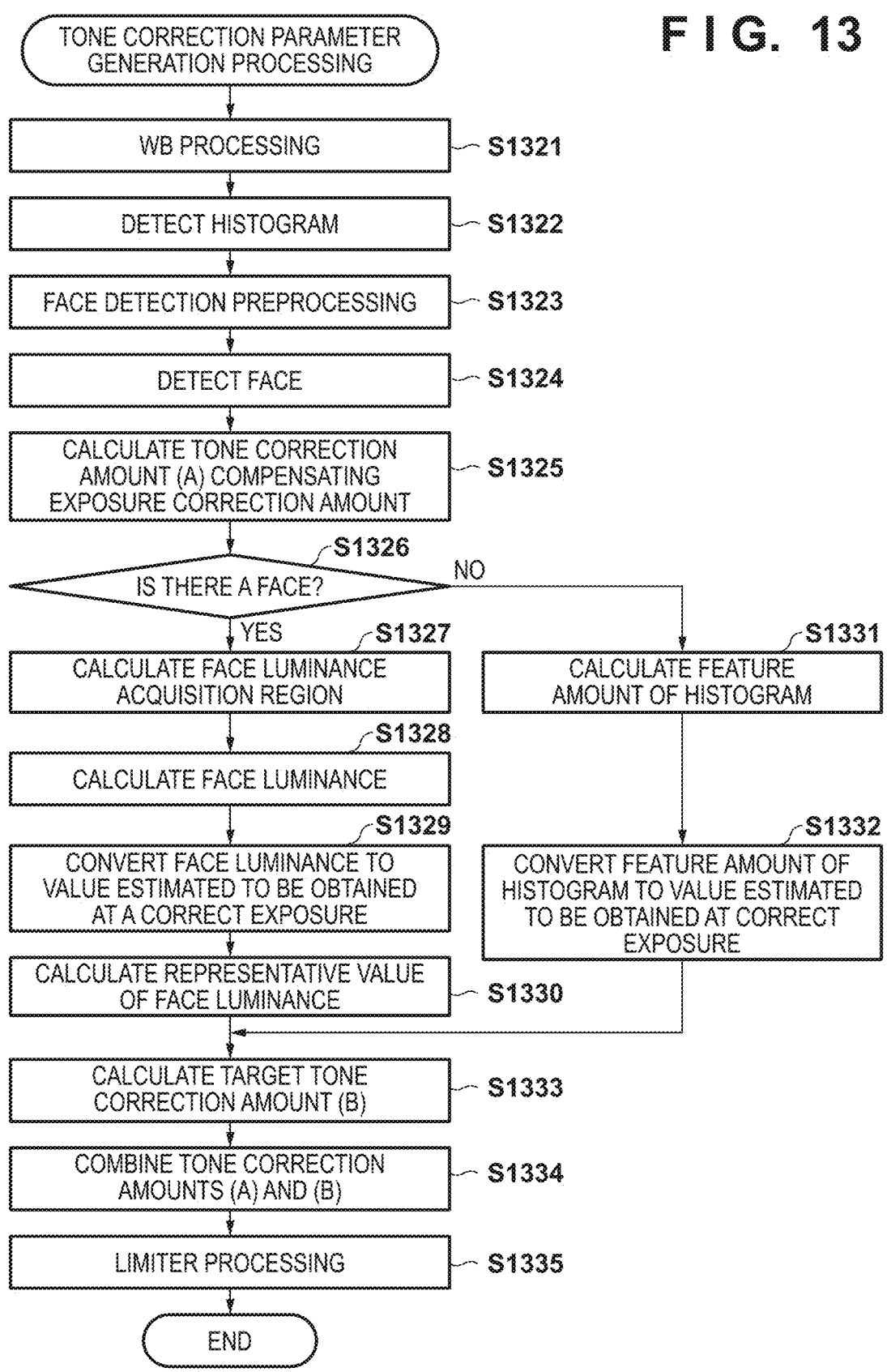
FIG. 13 is a flowchart illustrating tone correction parameter generation processing of the present embodiment.

Returning to the description of FIG. 7, in steps S704 to S706, the system control unit 201 calculates a tone correction table needed in tone correction processing. The details of the tone correction will be described using the flowchart in FIG. 13.

In step S1321, the system control unit 201 performs the WB processing using the WB coefficients generated in the processing step S701 to S703 in FIG. 7. In step S1322, the system control unit 201 performs histogram detection. Specifically, the gain values of white balance obtained in step S1321 are applied to the entirety of image data, and a histogram is created with respect to pixel values obtained by further performing gamma correction processing, as luminance information. In the gamma correction processing, a method may be used in which a known lookup table is used, but it is desirable that the same gamma characteristics as those used in the development are used. Note that simplified gamma characteristics such as gamma characteristics approximated by a polygonal line may be used in order to save the processing time and the memory amount. Note that, in many cases, the end portions of an image are not important in general, and are influenced by the reduction in the amount of light at the edge of lens depending on an imaging lens, and therefore the histogram may be created excluding the peripheral pixels.

In step S1323, the system control unit 201 performs face detection preprocessing. This processing is processing for allowing a face to be easily detected by performing reduction processing, gamma processing, and the like on image data. In step S1324, the system control unit 201 executes face detection processing on the preprocessed image data using a known method. With this face detection processing, the position and size of a region (face region) considered to be a face, and the reliability of the detection can be obtained.

In step S1325, the system control unit 201 calculates tone correction amounts (tone correction amounts A) for compensating exposure correction amounts (reduction amounts), as first tone correction amounts. Here, tone correction amounts having input/output characteristics are calculated such that dark portions of the image have a correct exposure, but pixels having luminance that is higher than or equal to a predetermined luminance level are not corrected (at least the exposure correction amount is not completely compensated). With this, blown out highlights in a bright portion after tone correction can further be suppressed. These tone correction amounts can be prepared in advance as a plurality of correction tables corresponding to the exposure correction amounts.

In step S1326, the system control unit 201 determines that a face has been detected if a face region whose reliability is higher than a pre-set evaluation threshold value is present in face regions that have been detected by the face detection processing in step S1324. The system control unit 201, if it is determined that a face has been detected, advances the processing to step S1327, and if it is determined that no face has been detected, advances the processing to step S1331.

In step S1327, the system control unit 201 calculates some region of the detected face region as a face luminance acquisition region. The face luminance acquisition region is a region for acquiring the luminance of a bright portion of the face, and the number and position thereof are not specifically limited. In step S1328, the system control unit 201 obtains average values for the respective types of included R pixels, G pixels, and B pixels with respect to each face luminance acquisition region. Moreover, the system control unit 201 performs gamma correction by applying white balance gain values to the respective average values of the R, G, and B pixels similarly to the histogram detection, and thereafter converts the corrected values to a luminance value Y using Equation 3.

$$Y = 0.299 \times R + 0.587 \times G + 0.114 \times B$$

Equation 3

Note that it is preferable that the white balance gain values that are applied in histogram detection and face detection are the gain values used in the WB processing with respect to the same image data. It is preferable that the luminance gamma is ideally the same as that used in development, but simplified gamma characteristics such as gamma characteristics approximated by a polygonal line may be used in order to save the processing time and the memory amount.

In step S1329, the system control unit 201 converts the luminance value obtained with respect to each face luminance acquisition region in step S1328 to a value that is estimated to be obtained at a correct exposure. This processing is processing for correcting the fact that, because the image data was obtained by performing capturing at an exposure lower than the correct exposure, the face luminance is detected to be lower than the luminance when capturing is performed at the correct exposure. The conversion of the luminance value may be performed such that the exposure correction amount (reduction amount) determined in the exposure control is compensated, or may be performed using the tone correction amounts calculated in step S1325.

In step S1330, the system control unit 201 calculates a representative value of the detected face luminance. A method of obtaining a maximum value from luminance values in the face luminance acquisition region of the detected face region is considered to be the method of obtaining the representative value, for example.

The processing in step S1331 is processing that is performed when the system control unit 201 determined that a face region was not detected, in step S1326. In step S1331, the system control unit 201 detects a histogram feature amount. The histogram feature amount may be the level (SD) to which belongs the pixel at which the cumulative frequency from the dark portion is 1% in the histogram, or the level (HL) to which belongs the pixel at which the cumulative frequency from the bright portion is 1%, for example. In the next step S1332, the system control unit 201 converts the histogram feature amount calculated in step S1331 to a value that is estimated to be obtained when capturing is performed at the correct exposure. This processing is processing for correcting the fact that, because the image data was obtained by performing capturing at an exposure that is lower than the correct exposure, the histogram feature amount is detected to be lower than that obtained when capturing is performed at the correct exposure. The conversion of the luminance value may be performed such that the exposure correction amount (reduction amount) determined in the exposure control is compensated or may be performed using the tone correction amounts calculated in step S1325.

In step S1333, the system control unit 201 calculates a target correction amount. The system control unit 201 obtains a target luminance level with respect to the representative luminance value of a face or the histogram feature amount. Also, the system control unit 201 creates a lookup table (input/output characteristics), as tone correction amounts B, in which output luminance levels with respect to input luminance levels are defined, from these target luminance levels and a minimum value and a maximum value of the luminance in the image data using spline interpolation or the like. The tone correction amounts B are second tone correction amounts.

Figure 14A:
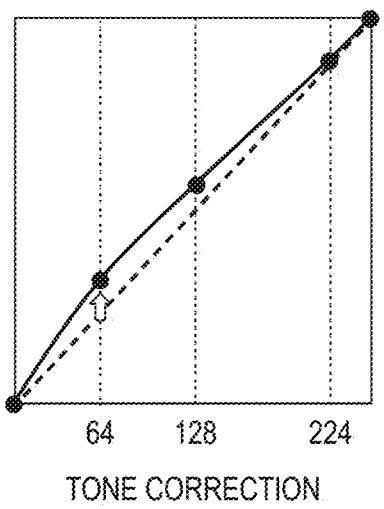
FIGS. 14A and 14B are diagrams illustrating tone correction amounts.
Figure 14B:
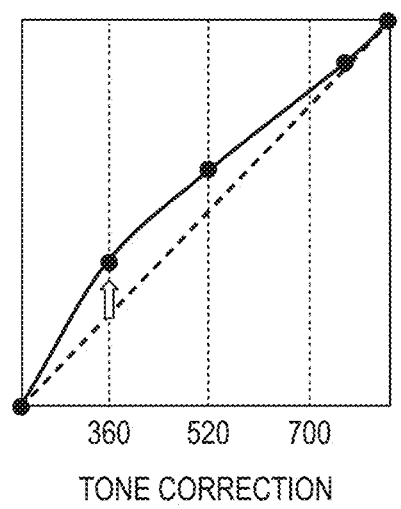
Figure 15A:
FIGS. 15A and 15B are diagrams illustrating an example of appearances of an SDR image and an HDR image.
Figure 15B:
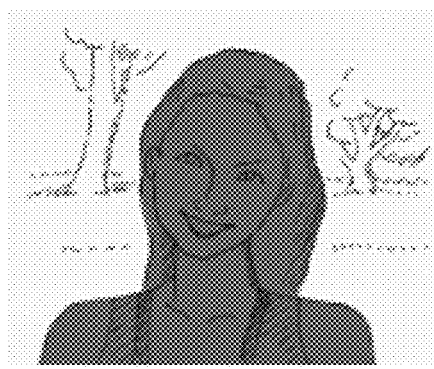

Here, the target tone correction amounts may be changed between HDR and SDR. For example, FIG. 15A shows an appearance of an SDR image, and FIG. 15B shows an appearance of an HDR image. Although the luminance value of the subject (person) is the same, but with respect to the background, in contrast to the upper limit being 100 cd/m² in SDR at the highest, the upper limit in HDR exceed 100 cd/m². As a result, even if the luminance value of a subject is the same, the subject may be felt to be dark in HDR. This phenomenon is referred to as brightness contrast, and is caused by a human visual property. For example, in FIGS. 15A and 15B, the luminance of the subject is the same, but the difference between the subject luminance and the background luminance is larger in FIG. 15B than in FIG. 15A. In such a case, a user feels that the subject is dark in FIG. 15B relative to FIG. 15A. That is, a high luminance region such as the sky can be expressed as brighter in HDR, and therefore it is highly possible that the subject is seen as dark relative to SDR. Therefore, in the present embodiment, tone characteristics such as shown in FIG. 14A are used in SDR, but tone characteristics such as shown in FIG. 14B are used in HDR such that tone correction amounts are applied so as to increase the luminance of the dark portion relative to that in SDR, and as a result, a preferable result with respect to the appearance can be obtained. Note that the correction for compensating underexposure is taken as an example of the tone correction in the present embodiment, but a similar tone correction can also be performed when correcting the brightness for image creation.

It is possible that the target luminance level with respect to the representative luminance value of the face or the histogram feature amount of the image data is set to a fixed value that is empirically considered to be preferable, but a different target luminance level may be set in accordance with the value of the representative luminance value or the histogram feature amount. In this case, a lookup table needs only be prepared in which the relation between the target luminance level with respect to the input level is determined for each parameter (representative luminance value or histogram feature amount) for setting the target luminance level.

The correction characteristics for realizing conversion to the target luminance level determined in this way are obtained using a method such as spline interpolation, and if needed, the correction characteristics are saved as a lookup table (or relational expression) for applying the tone correction amounts B.

In step S1334, the system control unit 201 combines the tone correction amounts A calculated in step S1325 and the tone correction amounts B calculated in step S1333. The system control unit 201 first applies the tone correction amounts A to the respective input luminance levels, obtains luminance values that are results obtained by applying the tone correction amounts B to the corrected luminance levels, and creates a lookup table in which the output luminance level with respect to each input luminance level is described, for example.

In step S1335, the system control unit 201 performs processing (limiter processing) for limiting the upper limit value of the combined correction amounts (combined tone correction amounts) obtained in step S1334. As a result of combining the tone correction amounts A and the tone correction amounts B, the correction amounts increase, and a noise amount is likely to be conspicuous in the corrected image, and therefore the overall correction amount is limited. The limiter processing can be realized by preparing maximum correction amounts that are allowed for the respective luminance values as a table, and by replacing an output level, of the values of the lookup table created in step S1334, that exceeds the corresponding maximum correction amount to an output level corresponding to the maximum correction amount. Note that, as the tone correction amounts, values for the shooting mode (SDR shooting or HDR shooting) set by the user may be calculated, or values for each of SDR and HDR may be calculated.

Returning to the description of FIG. 7, in step S707, the system control unit 201 performs development using the calculated white balance coefficients, the tone correction parameters, and various types of HDR parameters. An HDR developed image is generated using a color matrix, camera OETF curve data, a color adjustment parameter, a noise reduction parameter, a sharpness parameter, and the like as the other development parameters. An inverse characteristic of EOTF (Electro-Optical Transfer Function) of PQ (Perceptual Quantization) of ITU-R Recommendation BT.2100 is envisioned as the camera OETF (gamma curve), for example, but tone characteristics on the camera side may be combined as OOTF (Opto-Optical Transfer Function). Alternatively, OETF of HLG (Hybrid Log-Gamma) of the same ITU-R Recommendation BT.2100 may be used.

In step S708, the system control unit 201 generates an MPF (Multi Picture Format) image for simplified display such as dual screen comparison image by resizing the image developed in step S707, and compression-encodes the MPF image by HEVC.

In step S709, the system control unit 201 generates a thumbnail image to be used for index display and the like by further resizing the MPF image generated in step S708, and compresses the thumbnail image.

In step S710, the system control unit 201 compresses the HDR image developed in step S707 as a main image. Various compression methods are conceivable, and 10-bit YUV422 data may be compressed by H.265 (ISO/IEC 23008-2 HEVC), for example.

In step S711, the system control unit 201 determines the recording quality setting set by the user. The system control unit 201, if it is determined to be a setting in which only an RAW image is recorded, advances the processing to step S712, if it is determined to be a setting in which only an HDR image is recorded, advances the processing to step S713, and if it is determined to be a setting in which a RAW image and an HDR image are recorded, advances the processing to step S714.

Figure 8:
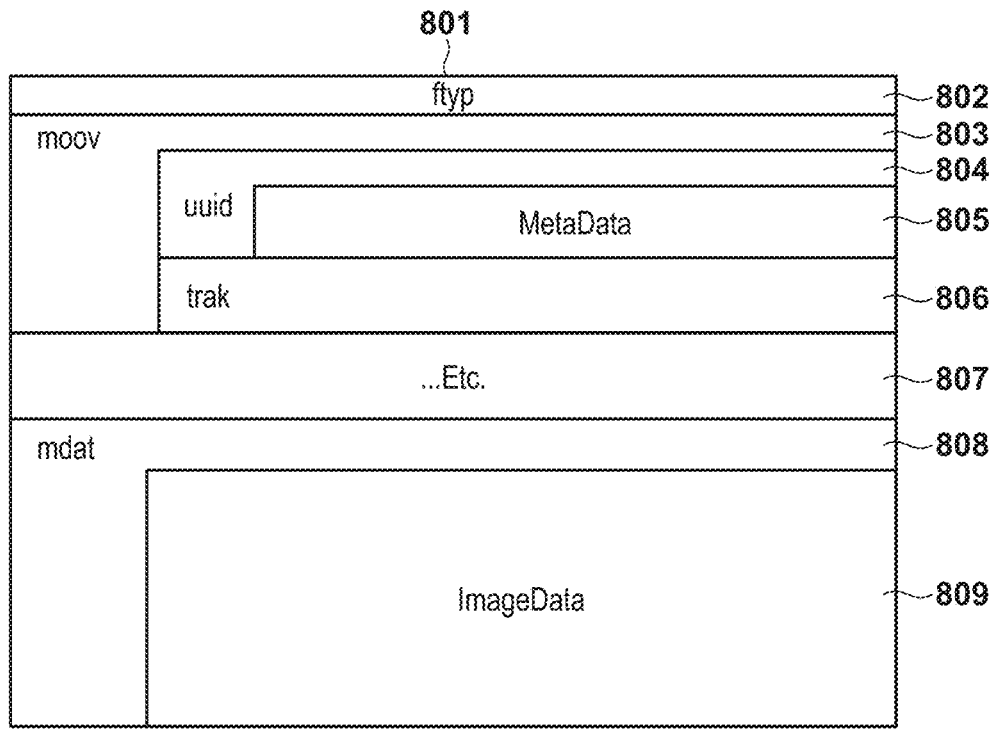
FIG. 8 is a data configuration diagram of a RAW file in the embodiment.

In step S712, the system control unit 201 generates a RAW image file having a structure as shown in FIG. 8 by compressing a RAW image and adding a header, and records the RAW image file in the recording medium 250 via a recording medium I/F 218. Several compression methods are conceivable, but lossless compression, in which no degradation is incurred and which is reversible, lossy compression, which is irreversible but can reduce the file size, or the like may be used. Also, in the header, the result of determination as to whether inside a white search frame with respect to the white balance that is obtained in step S1105, the histogram obtained in step S704, and the face detection result obtained in step S705 may be recorded as the detection metadata. The result of determination as to whether inside a white search frame detected here is a determination result before the bright and dark parts excluding processing in step S1106 is performed. Therefore, the same determination result is recorded regardless of whether the shooting mode is HDR shooting or SDR shooting. Also, when the user has set the HDR shooting mode, the HDR development parameters such as the white balance coefficients obtained by the processing in FIG. 11 and the tone correction amounts obtained in FIG. 13, and the MPF image for display generated by encoding, by HEVC, the image data obtained by HDR development in step S708 are also recorded as metadata, as shown in FIG. 9B. These pieces of data have different contents depending on whether the shooting mode is HDR shooting or SDR shooting, as described above. Note that, in the SDR shooting, the result of determination as to whether inside a white search frame and the development parameters in the case of using tone characteristics for the SDR described above are recorded. Note that, the configuration may be such that, even when HDR shooting is performed, the processing in steps S702 to S706 is performed for SDR, and the SDR development parameters are also generated and recorded along with the HDR development parameters. Also, a configuration may be adopted in which, because the processing load is large when the development parameters for both of HDR and SDR are generated, this processing is not performed in continuous shooting and the like, and is performed when the processing load is relatively small such as in the case of single shooting.

Also, a configuration may also be adopted in which, when the processing load is relatively small such as in the case of single shooting, a main image, an MPF image, a thumbnail image of SDR image quality are created using the SDR development parameters, separately from the HDR display image, and the HDR display image and the SDR display images are recorded in the same file (FIG. 9C).

Also, the configuration may be such that, when a thumbnail is displayed, since the image is small, it is sufficient that the outline of the image is discernible, and therefore only the thumbnail image created in step S709 is created and saved as an SDR development image (FIG. 9D). As a result of adopting such a configuration, even in a display apparatus or a PC that is not compatible with H.265 decoding, which is an HDR compression method, at least a thumbnail image can be displayed.

In step S713, the system control unit 201 compression-encodes the developed HDR image by HEVC, adds static metadata or dynamic metadata thereto, and records the resultant data in the recording medium 250 via the recording medium I/F 218 as a file in the HIEF (High Efficiency Image File Format) format. The static metadata includes x and y coordinates of three primary colors and the white point of the display conforming to CEA-861.3, a maximum luminance value, a minimum luminance value, a maximum content luminance level, a maximum frame-average light level of a mastering display, and the like. Also, the dynamic metadata includes metadata of dynamic tone mapping of color volume conversion defined in SMPTE ST 2094, and the like. Note that it is preferable that data has a depth of 10 bits or more in order to express the HDR characteristics by a PQ signal, but since the data in the known JPEG format has 8-bit depth, a container for HDR still image needs to be adopted. Here, the HEIF container is used, which is an image file format that has been developed by MPEG (Moving Picture Experts Group) and defined in MPEG-H Part 12 (ISO/IEC 23008-12). With HEIF, not only a main image, but a thumbnail, a plurality of temporally related images, and metadata such as EXIF and XMP can be stored in one file. Therefore, because 10-bit image sequence that has been compression-encoded by HEVC can be stored, usability is improved.

In steps S714 and S715, the pieces of processing in steps S712 and S713 are successively performed, and both the RAW image and the HDR image are recorded.

FIG. 8 shows a data structure of the RAW image file that is to be recorded to the recording medium 250 in the recording processing described above. The file format that will be illustrated as an example in the following is an ISO base media file format defined in ISO/IEC14496-12. This file format has a tree structure and nodes that are each called a box. Also, each box can have a plurality of boxes as child elements.

The RAW image file 801 includes a box ftyp 802 for describing the file type at the head, a box moov 803 including all pieces of metadata, a box mdat 808, which is a media data body of a track, and a box 807 for the other items. The box moov 803 includes a box uuid 804 for storing MetaData 805 and a box trak 806 for storing information for referencing to ImageData, as child elements. Metadata of an image is described in the MetaData 805, and the metadata is constituted by, regarding the image, created date and time, condition at shooting, information indicating in which of HDR and SDR the image was shot, the detection metadata described above, and other pieces of information regarding shooting, for example. The box mdat 808 includes Image-Data 809, which is still image data obtained by shooting, as a child element.

Note that the image data to be recorded in the ImageData 809 differs between the RAW image file obtained by shooting in SDR and the RAW image file obtained by shooting in HDR.

FIG. 9A illustrates the ImageData 809 to be recorded in the RAW image file obtained by shooting in SDR. The ImageData 809 in this case includes a THM image 821 obtained by developing in SDR image quality and subjecting to JPEG compression, an MPF image 822, a main image 823, a RAW image 824, and a RAW development parameter 825. Each image in SDR image quality is an image in which one color component has 8 bits (256 tones). Note that the RAW development parameter 825 in FIG. 9A includes at least a development parameter for SDR development.

FIG. 9B illustrates ImageData 809 to be recorded in a RAW image file that includes only HDR images as display images at the time of shooting in HDR. The ImageData 809 includes a THM image 826 obtained by developing in HDR image quality and subjecting to HEVC compression, an MPF image 827, a main image 828, a RAW image 824, and the RAW development parameter 825. Each image in HDR image quality is an image in which one color component has 10 bits (1024 tones). The RAW development parameter 825 in FIGS. 9B, 9C, and 9D includes at least a development parameter for HDR development.

FIG. 9C illustrates ImageData 809 to be recorded in a RAW image file that includes both HDR images and SDR images as display images at the time of shooting in HDR. The ImageData 809 in this case includes the THM image 821 obtained by developing in SDR image quality and subjecting to JPEG compression, the MPF image 822, the main image 823, the THM image 826 obtained by developing in HDR image quality and subjecting to HEVC compression, the MPF image 827, the main image 828, the RAW image 824, and the RAW development parameter 825.

FIG. 9D illustrates ImageData 809 to be recorded in a RAW image file in which, at the time of shooting in HDR, only the THM image is included as an SDR image, and the MPF and the main image are HDR images, as display images. The ImageData 809 in this case includes the THM image 821 obtained by developing in SDR image quality and subjecting to JPEG compression, the MPF image 827 obtained by developing in HDR image quality and subjecting to HEVC compression, the main image 828, the RAW image 824, and the RAW development parameter 825.

The file formats shown in the present embodiment are merely examples, and may include another box as needed. Also, the configuration may be such that the display image is included in the box of the moov 803 or in the box 807 for the other items.

As a result of adopting such a file format described above, a development parameter for SDR image is recorded in a RAW image file obtained by shooting in SDR, and a development parameter for HDR image is recorded in a RAW image file obtained by shooting in HDR. In this way, even in a case where the RAW development is to be performed later, development can be performed with a development parameter on which the setting at the time of shooting is reflected. For example, the apparatus (which may be the digital camera 100 or another apparatus such as a PC) that performs the RAW development determines in which of HDR and SDR the shooting was performed by referencing the MetaData 805 of the RAW image file. If it is determined that the shooting was performed in HDR, the RAW image data is developed as an HDR image using the development parameter for HDR image included in the file. Also, if it is determined that the shooting was performed in SDR, the RAW image data is developed as an SDR image using the development parameter for SDR image included in the file. In order to make such processing possible, the digital camera 100 of the present embodiment records a development parameter for SDR image in a RAW image file that is obtained by shooting in SDR, and records a development parameter for HDR image in a RAW image file that is obtained by shooting in HDR. Note that the apparatus that performs RAW development may record the developed HDR still image using the HEIF container described above.

Moreover, a configuration has been adopted in which the same determination result is recorded as the detection metadata regardless of HDR shooting or SDR shooting, and therefore, even the RAW image file that has been obtained by shooting in the HDR shooting mode can also be developed to an SDR image using the recorded detection data. Therefore, even an apparatus that can handle only SDR images can appropriately display a RAW image file obtained by shooting in the HDR shooting mode.

Other Embodiment

Although a preferred embodiment of the present invention has been described above, the present invention is not limited to the embodiment, and various modifications and changes can be made without departing from the spirit of the invention. For example, in the embodiment described above, HEVC (High Efficiency Video Coding) is adopted for encoding image data whose one color component exceeds 8 bits, but any type of encoding can be adopted as long as an image whose one color component exceeds 8 bits being able to be encoded. Also, in the embodiment described above, a case where the invention is applied to a digital camera has been described, but the invention is not limited to the embodiment, and may be applied to a computer having an image capturing function (such as a smartphone or a note PC with camera). Also, in the embodiment described above, a case where the connection with an external apparatus is USB connection has been described, but the invention is not limited to the embodiment, and may be applied to another connection form (such as wireless connection).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-080471, filed Apr. 19, 2019 which is hereby incorporated by reference herein in its entirety.

What is claimed is:

1. An image capturing apparatus comprising:
an interface;
a memory and at least one processor and/or at least one circuit,
wherein the processor and/or the circuit connects to an external apparatus by the interface;
wherein the processor and/or the circuit has a function of encoding image data;
wherein the processor and/or the circuit transmits an image file including decoding information to the external apparatus when the image data is encoded into an image file in a format in which the image data contains the decoding information, and transmits image data in the encoded image file and the decoding information to the external apparatus when the image data is encoded into an image file in a format in which the image data does not contain the decoding information.

2. The apparatus according to claim 1, wherein
the processor and/or the circuit generates the decoding information of the image data and transmits the image data and the decoding information to the external apparatus when the image data is encoded into the image file in the format in which the image data does not contain the decoding information.

3. The apparatus according to claim 1, wherein
wherein the processor and/or the circuit determines whether the image data is to be displayed or to be saved in the external apparatus, and
if the image data is to be displayed, transmits the image data and the decoding information, and
if the image data is to be saved, transmits the image file.

4. The apparatus according to claim 1, wherein
the format in which the image data contains the decoding information is a JPEG (Joint Photographic Experts Group) format, and
the format in which the image data does not contain the decoding information is an HEVC (High Efficiency Video Coding) format.

5. The apparatus according to claim 1, wherein
a protocol for transmitting data between the image capturing apparatus and the external apparatus is PTP (Picture Transfer Protocol) or PTP-IP (Picture Transfer Protocol over Internet Protocol).

6. The apparatus according to claim 1, wherein
the image data is image data obtained by shooting in High Dynamic Range (HDR) or image data obtained by shooting in Standard Dynamic Range (SDR) shooting, and
the external apparatus is a device that can display an image obtained by shooting in HDR.

7. The apparatus according to claim 1, wherein
the image data obtained by shooting in Standard Dynamic Range (SDR) shooting is encoded into the image file in the format in which the image data contains the decoding information, and
the image data is image data obtained by shooting in High Dynamic Range (HDR) is encoded into the image file in the format in which the image data does not contain the decoding information.

8. A method of controlling an image capturing apparatus that transmits image data to an external apparatus connected by an interface and encodes the image data, the method comprising:
transmitting an image file including decoding information to the external apparatus when the image data is encoded into an image file in a format in which the image data contains the decoding information, and
transmitting image data in the encoded image file and the decoding information to the external apparatus when the image data is encoded into an image file in a format in which the image data does not contain the decoding information.

9. The method according to claim 8, wherein when the image data is encoded into the image file in the format in which the image data does not contain the decoding information, generating the decoding information of the image data and transmitting the image data and the decoding information to the external apparatus.

10. The method according to claim 8, further comprising:
determining whether the image data is to be displayed or to be saved in the external apparatus, and
if the image data is to be displayed, transmitting the image data and the decoding information, and
if the image data is to be saved, transmitting the image file.

11. The method according to claim 8, wherein
the format in which the image data contains the decoding information is a JPEG (Joint Photographic Experts Group) format, and
the format in which the image data does not contain the decoding information is an HEVC (High Efficiency Video Coding) format.

12. The method according to claim 8, wherein
a protocol for transmitting data between the image capturing apparatus and the external apparatus is PTP (Picture Transfer Protocol) or PTP-IP (Picture Transfer Protocol over Internet Protocol).

13. The method according to claim 8, wherein
the image data is image data obtained by shooting in High Dynamic Range (HDR) or image data obtained by shooting in Standard Dynamic Range (SDR) shooting, and
the external apparatus is a device that can display an image obtained by shooting in HDR.

14. The method according to claim 8, wherein
the image data obtained by shooting in Standard Dynamic Range (SDR) shooting is encoded into the image file in the format in which the image data contains the decoding information, and
the image data is image data obtained by shooting in High Dynamic Range (HDR) is encoded into the image file in the format in which the image data does not contain the decoding information.

15. A non-transitory computer-readable storage medium which stores a program for causing an image capturing apparatus that transmits image data to an external apparatus connected by an interface and encodes the image data to execute a method comprising:
- transmitting an image file including decoding information to the external apparatus when the image data is encoded into an image file in a format in which the image data contains the decoding information, and
- transmitting image data in the encoded image file and the decoding information to the external apparatus when the image data is encoded into an image file in a format in which the image data does not contain the decoding information.

\* \* \* \* \*